United States Patent [19]
Copeland et al.

[11] 3,739,346
[45] June 12, 1973

[54] DATA TRANSMISSION SYSTEM

[75] Inventors: John R. Copeland; James F. Reid, both of Columbus, Ohio

[73] Assignee: The Great Atlantic & Pacific Tea Company, New York, N.Y.

[22] Filed: Sept. 23, 1971

[21] Appl. No.: 183,183

[52] U.S. Cl. .......... 340/172.5
[51] Int. Cl. .......... G06f 3/04
[58] Field of Search .......... 340/172.5

[56] References Cited

UNITED STATES PATENTS

| | | | |
|---|---|---|---|
| 3,430,204 | 2/1969 | Milford | 340/172.5 |
| 3,324,460 | 6/1967 | Leonard et al. | 340/172.5 |
| 3,275,995 | 9/1966 | Hagopian | 340/172.5 |
| 3,368,028 | 2/1968 | Windels et al. | 340/172.5 |
| 3,359,543 | 12/1967 | Corr et al. | 340/172.5 |
| 3,531,776 | 9/1970 | Sloate | 340/172.5 |
| 3,587,044 | 6/1971 | Jenkins | 340/172.5 |
| 3,576,396 | 4/1971 | Sloate | 340/172.5 |

*Primary Examiner*—Gareth D. Shaw
*Attorney*—Watson, Leavenworth & Kelton

[57] ABSTRACT

Systems are disclosed for use in producing punched cards, indicative of subjects and characteristics of subjects defined in a succession of digital signal groups. In a preferred application of the invention, the signal groups define subjects comprising ordered grocery items and subject characteristics comprising the quantity of the item required. The signal groups are conditioned for transmission by telephone lines, are regenerated after transmission and are processed in a manner effective for operating a card punch machine having the capability of punching multiple card columns at one time. The regenerated signal processing is also effective to arrange subject and characteristic information applied to the card punch machine in a manner providing increased information content in the punched card, thereby enabling efficient warehouse operations.

21 Claims, 16 Drawing Figures

Patented June 12, 1973

3,739,346

14 Sheets-Sheet 2

DATA TRANSMISSION SYSTEM

FIELD OF THE INVENTION

This invention relates to systems for use in the transmission of information from a central station to a remote station over conventional telephone lines and more particularly to systems of this type wherein the information content of transmitted information comprising digital signals is provided at the remote station in punched cards.

BACKGROUND OF THE INVENTION

In various instances, it is desirable to transmit information over conventional telephone lines from a central station to a remote station and to present the information in punched cards to expedite use of the information at the remote station. For example, in the ordering of grocery items for the retailing thereof, the central station may be an order-accumulating station and the remote station may be a warehouse containing all orderable grocery items. A punched card is evidently useful in this instance for presenting the transmitted information in form readily useful for automatic selection of ordered items from the warehouse, or in providing visual indication of the ordered items in the warehouse for enhancing manual collection thereof. Copending application Ser. No. 183,071, entitled "Warehouse Indicator System" and filed concurrently herewith, is descriptive of a system operatively responsive to punched cards for providing selective indication, at suitable warehouse locations, of both ordered items and the quantities thereof required by a retailer.

Systems heretofore known and commercially available for providing, at a remote station, punched cards definitive of transmitted information are limited in efficiency by constraints imposed thereon both by the characteristic duality of the transmitted information and by operational limitations of card punch machines incorporated therein.

In respect of the constraint imposed on system efficiency by the character of the transmitted information, the transmitted information, in the exemplary instance, involves indication of both the item ordered and the quantity thereof required. Punched cards are two-dimensional and systems heretofore known have assigned each of these variables singularly to one card dimension. Thus, in the standard 80-column punch card, each column is assigned in these systems to an orderable item and a punch is entered in that column in decimal position indicative of quantity required. Since the number of different orderable items in a warehouse is typically in the thousands, a vast number of cards of this type are involved in each order. Accordingly, extensive time is involved both in card punching and in the subsequent processing of cards punched.

In respect of the constraint imposed on system efficiency by card punch machine operational limitations in systems heretofore known, each card column is punched individually and at a rate substantially slower than the rate at which the data for such column may be transmitted. While data may be transmitted at a higher rate if a memory facility is provided at the remote station sufficient to store transmitted information for subsequent application to the card punch machine, transmission system expense is greatly increased by such memory facility requirement.

SUMMARY OF THE INVENTION

It is an object of the present invention to provide improved systems for use in producing punched cards indicative of the information content of digital signals.

It is a further object of this invention to provide improved systems for use in transmitting digital data signals by telephone lines and thereafter providing punched cards indicative of the information content of transmitted information.

It is a more particular object of the present invention to provide a digital signal transmission system producing punched cards having high information content density at a rate compatible with desired data transmission rates.

In attaining the foregoing and other objects, the invention provides a transmission system having a transmitting station, including a digital signal source and a data set for conditioning the digital signals for transmission by telephone lines, and receiving station, including a data set for regenerating the digital signals from the conditioned signals after transmission thereof, a card punch machine adapted to punch multiple card columns at one time and an interface unit operative to assemble the information content of the regenerated digital signals in high density format and to transfer assembled information to the card punch machine in a manner sufficient to gain the benefit of the multiple column punching capability thereof. The invention provides further systems comprising portions of such transmission system.

The foregoing and other objects and features of the invention will be evident from the following description of the invention and from the drawings wherein like reference designations identify like parts throughout.

DETAILED DESCRIPTION OF PREFERRED EMBODIMENTS

Figure 1:
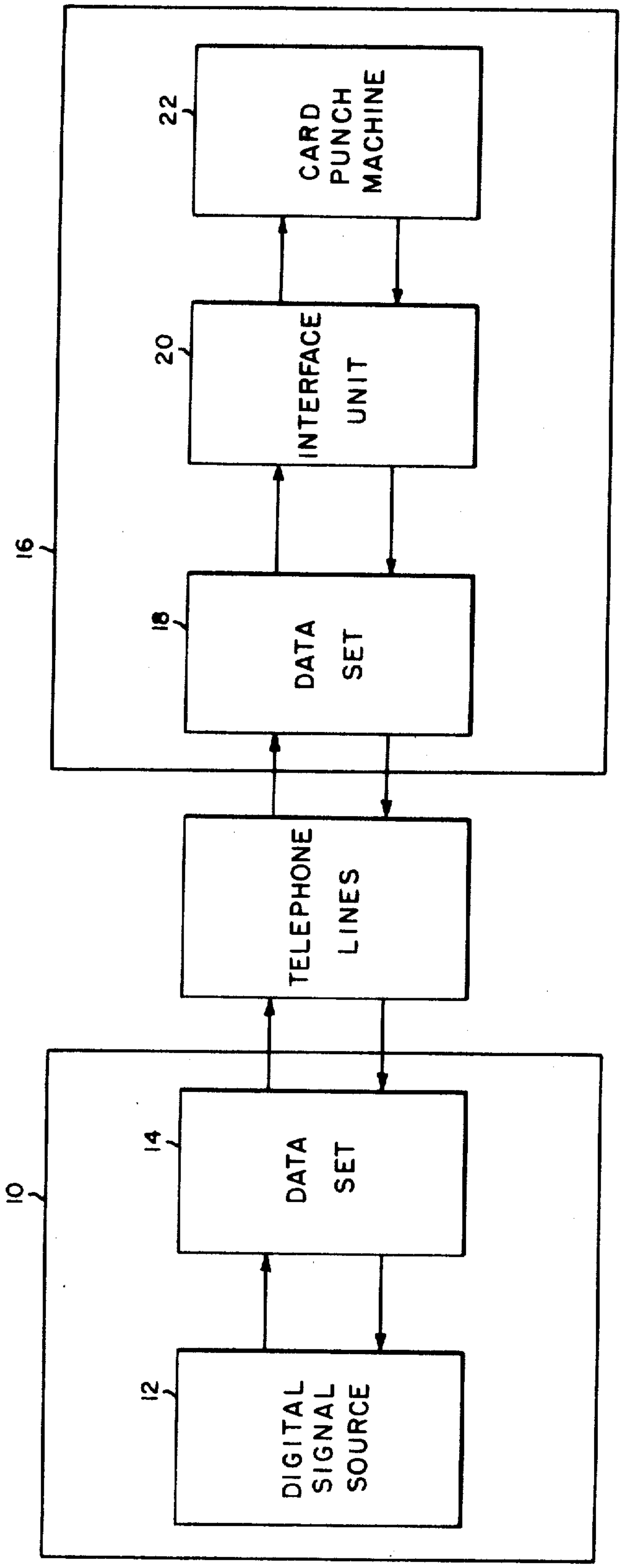
FIG. 1 is a block diagram of the transmission system of the invention.

Transmitting station 10 of the FIG. 1 system comprises digital data source 12 and data set 14. Source 12 is preferably a commercially available unit, e.g., Model D522 Data Terminal, produced by Digitronics Incorporated. This unit generates a message comprising digital signals or bits (ONES and ZEROS) in the form indicated in Table 2 below. Data set 14 is preferably a commercially available unit, e.g., Bell System 21B Data Set, produced by the American Telephone & Telegraph Company. This data set is adapted to condition digital signals applied thereto for transmission over conventional telephone lines and has the further facility, on receiving conditioned signals from telephone lines, for regenerating the digital signals therein as well as a clock signal synchronous with the clock signal employed in forming the message. Thus, receiving station 16 incorporates an identical data set 18 which regenerates the digital signals and clock signal of source 12 and applies the same to interface unit 20. Card punch machine 22 is included in the receiving station for the generation of cards, each bearing the information content of a single message generated by source 12. Machine 22 is preferably a GDI Model 60 Card Punch, produced by General Design, Inc. This machine, not commercially available prior to the present invention, is distinct from typical card punch machines in that it has the facility for punching two card columns simultaneously. The potential for increased speed in card preparation by such machine is realized, for telephone-transmitted digital signals, by particular functions accomplished in interface unit 20, the structure and operation of which is described in detail below.

Certain summary description of card punch machine 22 will be helpful to an understanding of the present invention. The machine incorporates 24 punch pins operable in groups of 12 upon residence in the machine of two separate groups of 12 bits of information. On completion of the punching of two columns of a card in accordance with such information, the machine provides indication thereof, and if the bits necessary for punching the successive two card columns are then present in input buffers of the machine, the machine immediately advances to its next twocolumn punch operation. This cycle recurs until the card punch machine is advised of the end of input data.

An understanding of the invention will be facilitated by detailed discussion of the format of the message generated by data source 12. Referring to Table 2 below, the message includes a preamble of fixed format including an eight-bit IDLE portion, which is repeated continuously for a given time period, an eight-bit SYNC portion, which is repeated four times in succession and an eight-bit STX portion. Following such preamble two variable format message portions occur, the first comprising an eight-bit BLK # portion and the second comprising a succession of individual groups of eight-bits each. Each such group is a character-indicating word and this message portion is collectively denominated WORDS. Each word includes one bit, $X_1$, for parity indication, three bits, $X_3$, $X_4$ and $X_5$, for identifying one of eight ($2^3$) variants for characteristic identification and two bits, $X_6$, $X_7$, for field designation. The WORDS portion of the message may conveniently be regarded as comprising a succession of *n* groups of signals, each signal group identifying a one of *n* subjects by virtue of its position in the succession. The characteristic identifying bits ($X_3$–$S_5$) may conveniently be regarded as identifying one of a number of possible characteristics for the subject. Evidently, where the characteristic identifying bits are *m* in number, they permit the selective identification of a one of $2^m$ characteristics for the subject. For purposes of interrelating the WORDS message portion to the exemplary instance of warehoused item identification , *n* subjects may correspond with *n* different retail items stored in the warehouse and *m* may indicate the quantity required of such stored item. By such arrangement, each WORDS message portion may be indicative of *n* stored items in quantities ranging from zero to $2^m$—1. Where *n* is, e.g., 300 and *m* is 3, the WORDS message portion may identify 300 warehoused items and may further indicate orders for quantities thereof from zero to seven. In a particularly preferred arrangement, the WORDS message portion comprises 300 and 18 words or variants, 300 being used for subject and characteristic identification and 18 for auxiliary information, e.g., store number, warehouse location, etc. This information is entered in the first 79 and the upper half of the 80th card column, block number indication and card quality being entered in the lower half of the 80th column.

Following the WORDS message portion, the message includes a postamble, the ETX portion, of fixed format and a final eight-bit portion, LRCC.

Figure 1A:
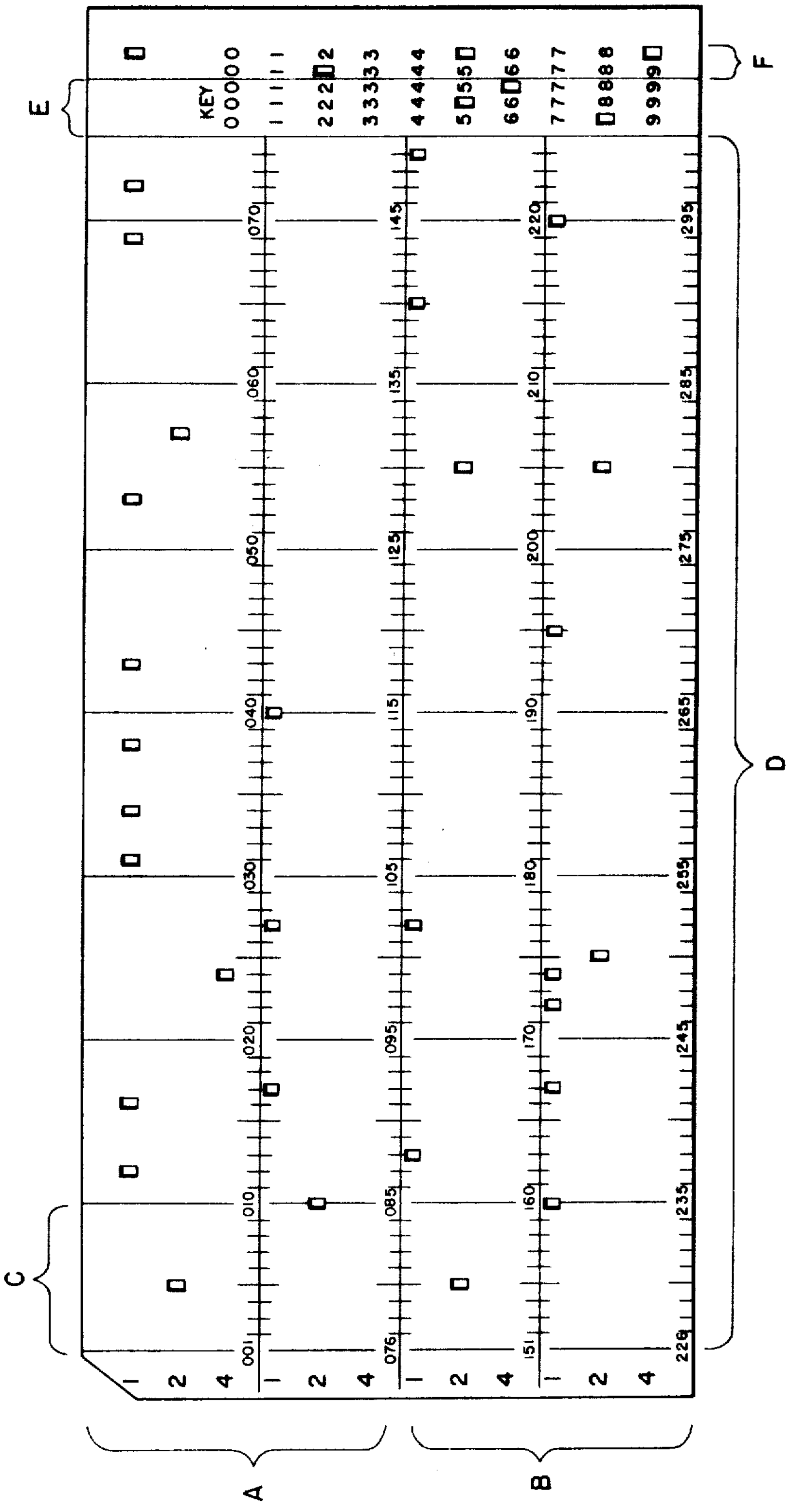
FIG. 1A depicts a card produced by the system of FIG. 1.

FIG. 1A illustrates the preferred form of punch card produced by the system of the invention. The card includes *p* equals eighty vertical columns and *q* equals 12 horizontal rows. In the interests of containing the contents of each message in a single such card, the card is subdivided to accommodate subjects of number *n*, e.g., 300, which exceeds the number *p*. Accordingly, the card is divided into an upper field A and a lower field B and each such field is divided into two sections, each embracing *m* or three horizontal rows. The above-discussed bits $X_6$, $X_7$ are indicative of the field, A or B, into which the subject characteristic information of each character-indicating word is to be entered.

In portion C of the FIG. 1A card a single punch is shown as residing in the uppermost section of field A. This punch is indicative of an order for warehoused item 005, the order quantity being two. As shown, a typical produced card may contain numerous such punches and, in instances where no punch is entered, e.g., for columns 001–004 and 006–010, no order is placed for the warehoused items identified thereby. A predetermined discipline is employed as between the succession in which the WORDS message portion is generated and the card locations indicating particular warehoused items. Accordingly, warehoused item 005 need not be the fifth word in the message, but need only be correlated with the message such that the message subject characteristic, i.e., $2^1$, be entered in card location 005. In the preferred arrangement of the card, the first 75 card columns, indicated as D, are employed to provide selective punch card locations for 300 warehoused items. The next three card columns, identified as E, are employed to provide decimal indication of the retail sore placing the order, i.e., store No. 856 as shown. The last two card columns, indicated as F, are employed for providing auxiliary information and specifically, in the case of field B of the last card column, for entry of block number information and card quality.

Figure 2:
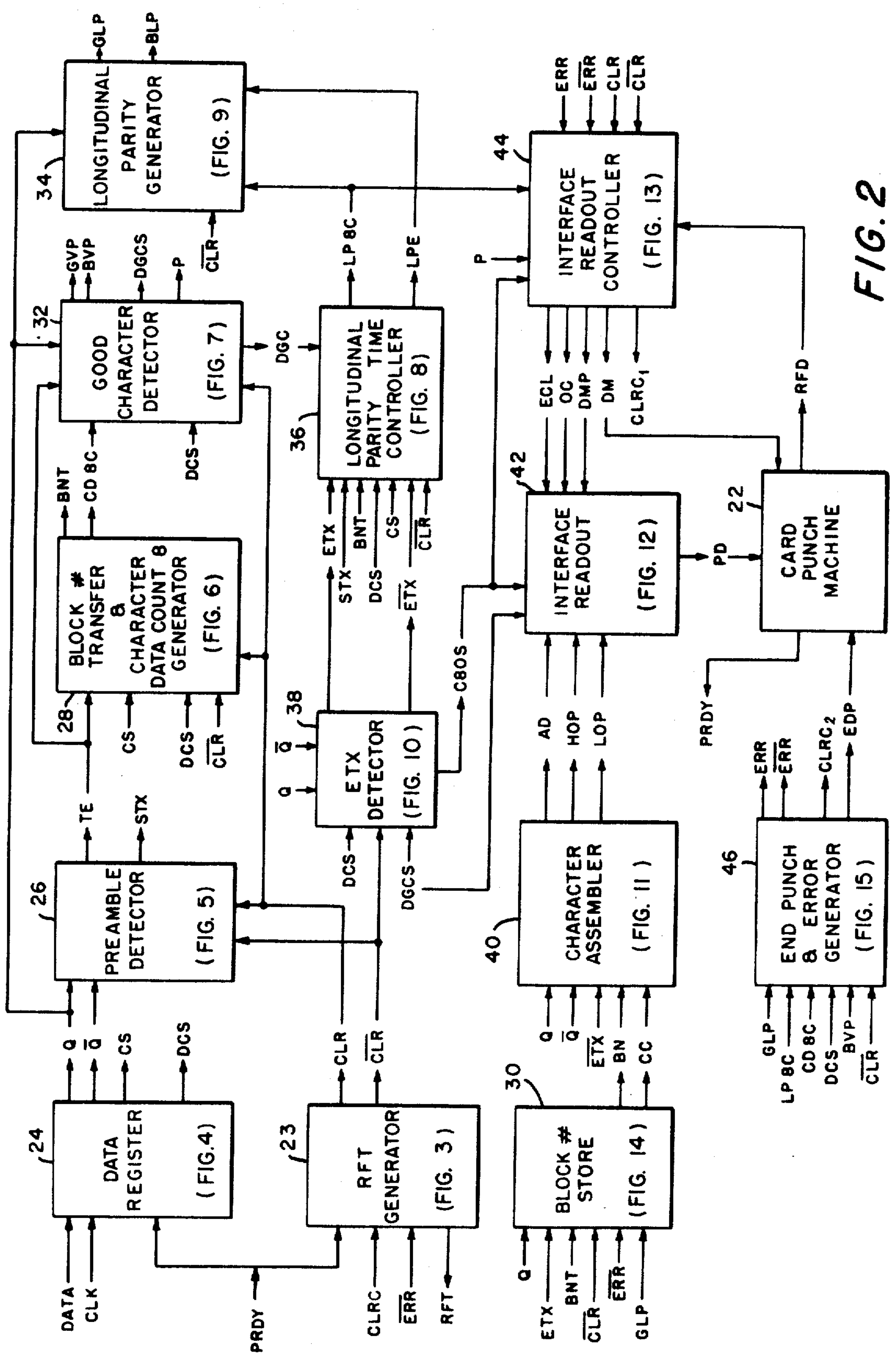
FIG. 2 is a detailed block diagram of the interface unit of FIG. 1.

Referring to FIG. 2, interface unit 20 is shown in block diagram form in association with card punch machine 22. The individual components of the interface unit receive various control signals in their performance of functions discussed in detail in the following subsections. For convenient reference, these signals are tabulated in Table 1 below.

TABLE 1

| Signal | Definition |
|---|---|
| PRDY | punch card machine ready when HI |
| $CLRC_1$ | clear control when LO |
| $CLRC_2$ | clear control when LO |
| ERR | error when HI |
| $\overline{ERR}$ | error when LO |
| RFT | receiving station ready for transmission when HI |
| CLR | clear interface when HI |
| $\overline{CLR}$ | clear interface when LO |
| CLK | clock when HI |
| CS | clock strobe when HI |
| DCS | delayed clock strobe when HI |
| STX | STX portion in register when HI |
| TE | timing enable when HI |
| BNT | transfer block number when HI |

| | |
|---|---|
| CD8C | character data eight-count when HI |
| ETX | end of transmission when HI |
| $\overline{ETX}$ | end of transmission when LO |
| GVP | good vertical parity when HI |
| BVP | bad vertical parity when HI |
| DGC | good character in data register (delayed) when HI |
| DGCS | good character strobe (delayed) when HI |
| $\overline{GC}$ | good character when LO |
| $\overline{P}$ | preset when LO |
| LPE | longitudinal parity enable when HI |
| LP8C | longitudinal parity eight-count when HI |
| GLP | good longitudinal parity when HI |
| BLP | bad longitudinal parity when HI |
| C8OS | column 80 strobe when HI |
| HOP | high order part when HI |
| LOP | low order part when HI |
| CC | correct card when HI |
| ECL | even column load when HI |
| OC | odd column when HI |
| DMP | data marker preset when HI |
| DM | data marker when HI |
| EC | even column when HI |
| RFD | punch ready for data when HI |
| EDP | end of data to punch when HI |

GENERAL DESCRIPTION OF INTERFACE UNIT 20 (FIG. 2)

Interface unit operation is initiated by the clearing of logic circuits by RFT generator 23. This generator also provides a signal initiating transmission of a single message by source 12 on indication of the operative readiness of card punch machine 22. When the transmitted message is received by data set 18, the regenerated message is received by data register 24 which provides output signals indicative of message content and clock signals for control of the interface unit. The received message preamble content is detected by preamble detector 26 and this detector then provides output indication. Generator 28 is operative upon such detector 26 output indication to provide a control signal for the storage of message block number information in block # store 30. Generator 28 also provides, on a continuing basis during passage of the WORDS message portion through register 24, an output signal indicating the residence in register 24 of each character-indicating word. Good character detector 32 is operatively responsive to each such generator 28 output signal to examine the vertical parity of the character-indicating word then in register 24 and to provide output parity indication. Detector 32 also provides a timing signal indicating receipt of a predetermined number of character-indicating words. Longitudinal parity of the received message is determined by a longitudinal parity subsystem comprising units 34 and 36. Longitudinal generator 34 accumulates longitudinal parity information throughout message receipt in response to a first input signal provided by longitudinal parity time controller 36 and provides a single indication of longitudinal parity, on completion of the processing of each message, in response to a second control signal provided by controller 36. The end of each message transmission is detected by ETX detector 38.

During receipt of the message, character assembler 40 is operative to continuously assemble the characteristic identifiers in the WORDS message portion in groups of four and to apply such assembled information to interface readout 42. Interface readout 42 is responsive to control signals provided by interface readout controller 44 to accumulate information assembled by character assembler 40 and to selectively transfer accumulated information to card punch machine 20 such that the card punch machine is provided with data sufficient for the simultaneous punching of multiple columns throughout message receipt. In generating such control signals, controller 44 is operatively responsive to the above-mentioned signal provided by detector 32 indicative of the receipt of a predetermined number of character-indicating words. Errors in transmission and the completion of message transmission are sensed by generator 46 which provides output signals indicative of error or indicative of the end of the supplying of data to the card punch machine and output signals which initiate operation of generator 23.

CIRCUIT ELEMENTS

Figure 3:
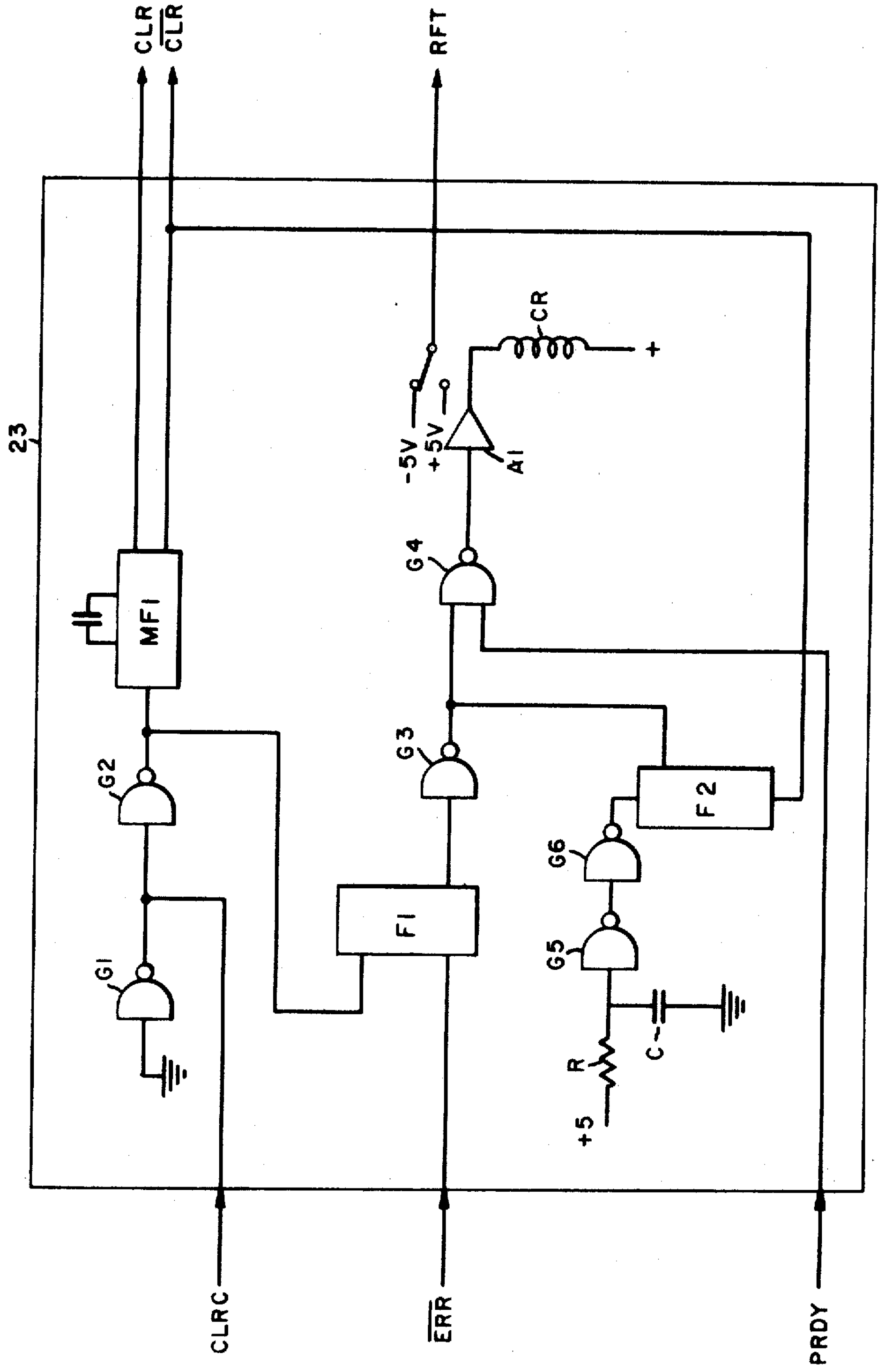
FIGS. 3–15 are schematic drawings of the individual components comprising the interface unit of FIG. 2.

The circuit elements used throughout interface unit 20 are conventional and are indicated by generally known symbology in FIGS. 3–15. NAND gates, typified by G4 of FIG. 3, provide a LO output when all inputs thereto are HI and provide a HI output for all other input conditions. LO constitutes a voltage of magnitude less than HI. Preferably LO is zero and HI is 5 volts. Monostable flip-flops, typified by MF1 of FIG. 3, are triggered in response to an input pulse and thereupon provide an output pulse. A time delay between the output and input pulses is provided where a capacitance is connected to the monostable flip-flop as the case of MF1. Bistable flip-flops, denominated F, are employed with gated or direct inputs. Inverting amplifiers, typified by I1 (FIG. 4), and non-inverting amplifiers, typified by A1 (FIG. 3), are also used. AND gates, typified by G19 (FIG. 5), provide a HI output where all inputs thereto are HI and provide a LO output for all other input conditions.

RFT GENERATOR

The circuit means of FIG. 3 is operatively responsive to input signals comprising PRDY (punch card machine ready when HI), CLRC (clear control when LO) and $\overline{ERR}$ (no error when HI) to provide a first output signal RFT (receiving station ready for transmission when HI) and further output signals CLR (clear interface when HI) and $\overline{CLR}$ (clear interface when LO). The PRDY signal is generated by the card punch machine on its operational readiness. The manner of generation of the CLRC and $\overline{ERR}$ signals is discussed below in connection with FIGS. 13–15. The CLR, $\overline{CLR}$ and RFT signals are generated as follows.

G1 receives a constant LO signal and provides a HI output to G2. When CLRC is HI, G2 maintains the input to MF1 LO and MF1 in turn provides CLR LO and $\overline{CLR}$ HI. CLRC is selectively LO for a short time period after the receiving station has processed a complete message. Following such time period CLRC is again HI. Upon the occurrence of a CLRC LO, G2 provides a HI to MF1. Thereafter, as CLRC goes HI, G2 goes LO and this negative-going pulse triggers MF1 whereupon MF1 provides a CRL HI and a $\overline{CRL}$ LO. Accordingly, the CLR signal is normally LO and periodically HI. The $\overline{CLR}$ signal is normally HI and periodically LO.

The negative-going pulse from G2 sets F1 HI if $\overline{ERR}$ is HI, i.e., no error is present, and the F1 input to G3 is LO. The G3 input to G4 is thereby HI, and if PRDY is HI, G4 provides a LO input to A1, energizing relay CR and providing an RFT HI. The RFT HI signal is conditioned for transmission to the transmitting station by the receiving station data set. Upon receipt of the RFT HI signal, the transmitting station starts its message transmission.

Generation of RFT HI is inhibited by F2 during interface power start-up and also upon interface clearing. For a short period after power start-up, determined by the time constant RC, the input to G5 is maintained LO, and the G6 output is thereby LO. After such time, the G5 input is HI and G6 applies a HI to F2. Such direct input to $\overline{F2}$ sets F2 HI, a condition which persists except for $\overline{CLR}$ LO periods during which F2 is reset LO.

DATA REGISTER

In receiving the modulated transmitted message, the receiving station data set demodulates the same and regenerates the digital signals comprising the message and the clock signal used at the transmitting station in generating the message. These signals are applied to the interface and specifically to the data register thereof illustrated in FIG. 4, the data set output signals identified respectively as data and CLK. The DATA signals are in format identified in Table 2 below and the CLK signals comprise positive-going pulses occurring synchronously with DATA.

Figure 4:
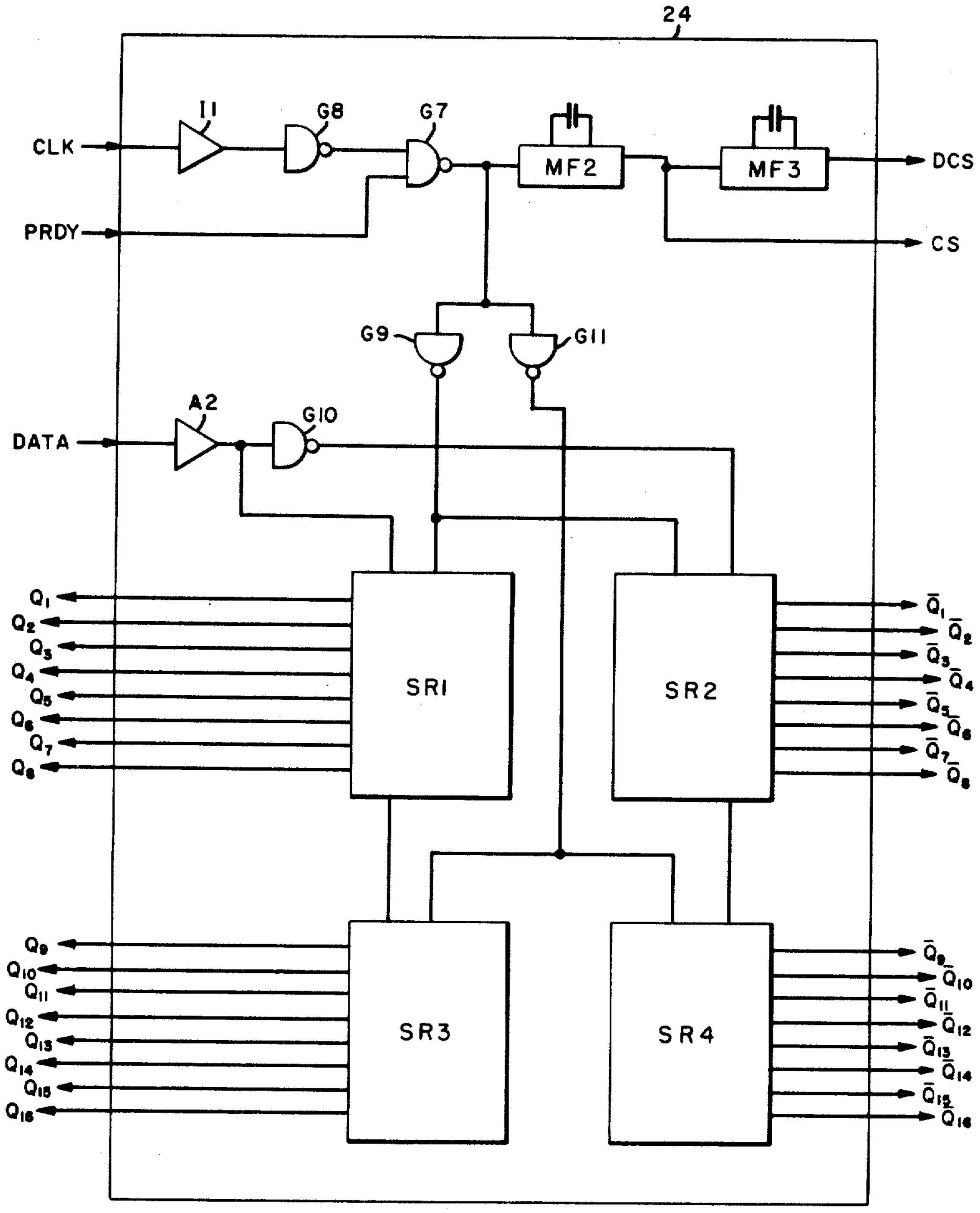

The circuit means of FIG. 4 includes a first functional section operatively responsive to input signals CLK and PRDY to provide output signals CS (clock strobe) and DCS (delayed clock strobe) for use in timing interface logic operations. G7 applies a LO to MF2 when both G7 inputs are HI. The lower G7 input is continually HI during card punch machine readiness and the upper G7 input goes HI selectively on the occurrence of CLK HI by reason of the inverting actions of I1 and G8. On each LO input, MF2 provides a CS HI. In terms of relative time of occurrence, each CS HI is delayed with respect to its initiating CLK HI by the capacitive delay employed in conjunction with MF2. The output of MF2 is also applied to MF3 for generating a DCS HI following each CS HI.

The second functional section of FIG. 4 incorporates a plurality of shift registers, SR1–SR4, adapted to provide various outputs, $Q_1$–$Q_{16}$ and $\overline{Q_1}$–$\overline{Q_{16}}$, indicative of the register contents. SR1 receives DATA from A2, shift signals being applied to SR1 by G9, time coincident with CLK HI. SR2 receives inverted DATA from G10 and shift signals from G9. The outputs of SR1 and SR2 are shifted serially into SR3 and SR4 which receive shift signals from G11. SR1 and SR2 are preferably provided by a single eight-bit shift register providing outputs $Q_1$–$Q_8$ and $\overline{Q_1}$–$\overline{Q_8}$. SR3 and SR4 also are preferably provided by a single eight-bit shift register providing outputs $Q_9$–$Q_{16}$ and $\overline{Q_9}$–$\overline{Q_{16}}$.

TABLE 2

| Message | Portion | | | | | | | Content |
|---|---|---|---|---|---|---|---|---|
| IDLE | 0 | 1 | 0 | 1 | 0 | 1 | 0 | 1 |
| SYNC | 0 | 0 | 1 | 1 | 0 | 1 | 0 | 0 |
| SYNC | 0 | 0 | 1 | 1 | 0 | 1 | 0 | 0 |
| SYNC | 0 | 0 | 1 | 1 | 0 | 1 | 0 | 0 |
| SYNC | 0 | 0 | 1 | 1 | 0 | 1 | 0 | 0 |
| STX | 0 | 0 | 1 | 0 | 0 | 0 | 0 | 0 |
| BLK # | 1 | X | X | X | X | X | X | X |
| WORDS | $X_1$ | $X_2$ | $X_3$ | $X_4$ | $X_5$ | $X_6$ | $X_7$ | $X_8$ |

(318 variants)

$X_1$ = odd parity bit
$X_2$, $X_8$ = spare
$X_3$, $X_4$, $X_5$ = characteristic identifier
$X_6$, $X_7$ = field designation

| | | | | | | | | |
|---|---|---|---|---|---|---|---|---|
| ETX | 1 | 1 | 1 | 0 | 0 | 0 | 0 | 0 |
| LRCC | X | X | X | X | X | X | X | X |

PREAMBLE DETECTOR

Figure 5:
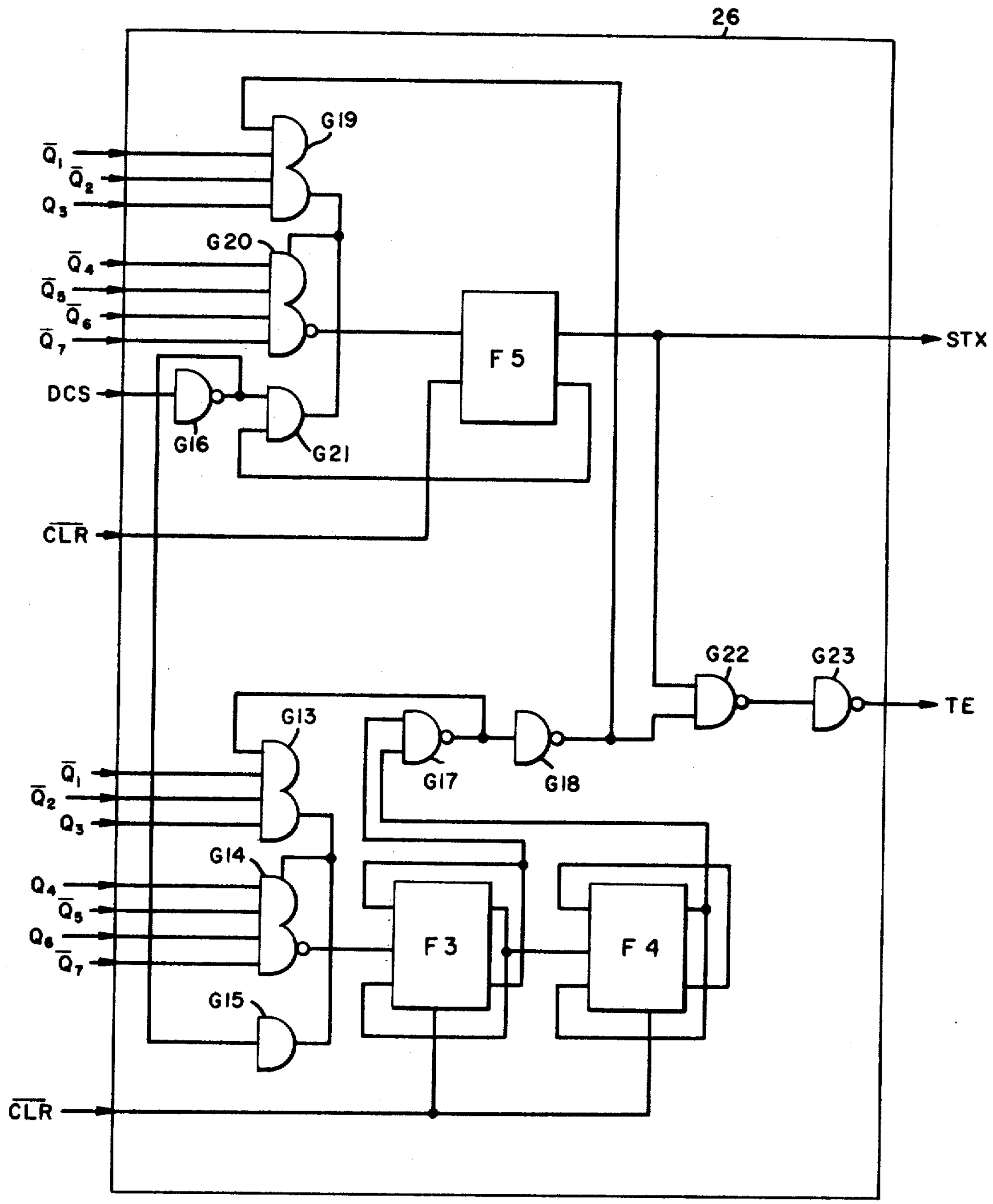

As indicated in Table 2, the IDLE portion of the message comprises an alternating succession of ONES and ZEROS and is transmitted continuously for a time period preceding the SYNC portion of the message. The latter portion is transmitted four times in succession. The circuit means of FIG. 5 is adapted to detect the receipt in the data register of FIG. 4 of two successive SYNC portions and to detect the subsequent receipt in the data register of the STX portion of the message. On such detection, the FIG. 4 circuit means is operative to generate an output signal indicating that the message preamble, i.e., SYNC and STX portions, has been properly received.

The circuitry for detecting receipt of two successive SYNC portions is shown in the lower portion of FIG. 5. A collective gating arrangement comprising G13, G14 and G15 is provided for receiving an inverted DCS from G16 and those Q and $\overline{Q}$ outputs of SR1 and SR2 (FIG. 4) which are selectively indicative of the SYNC portion. On the occurrence of the prior $\overline{CLR}$ LO, F3 and F4 were reset LO. F3 is set HI when all inputs to such composite gate are HI. On the next successive like occurrence of HI inputs to the composite gate, i.e., on residence of the second SYNC portion in SR1 and SR2, F3 is reset LO, thereby setting F4 HI. At this juncture both inputs to G17 are HI and G17 applies a LO input to G13 thereby disabling the composite gate after such detection of two successive SYNC portions. At the same time, G18 applies an enabling HI input to a further composite gate comprised of G19, G20 and G21, concurrently with entry of the STX portion into SR1 and SR2. The remaining inputs to this composite gate comprising DCS inverted, F5 LO (so reset by the prior $\overline{CLR}$ LO) and selective Q and $\overline{Q}$ outputs of SR1 and SR2 indicative of STX, are HI on residence of STX in SR1 and SR2. On this event, F5 receives a LO input and is thereby set HI providing an STX HI. G22, having two HI inputs at this juncture, provides a LO output to G23 which in turn provides a TE (timing enable) HI.

With F5 set HI, G21 is disabled and the upper composite gate is accordingly rendered unable to vary the state of F6 throughout the remainder of the transmission period. TE HI will thus persist until occurrence of the next $\overline{CLR}$ LO.

BLOCK NUMBER TRANSFER AND CHARACTER COUNT GENERATOR

Figure 6:
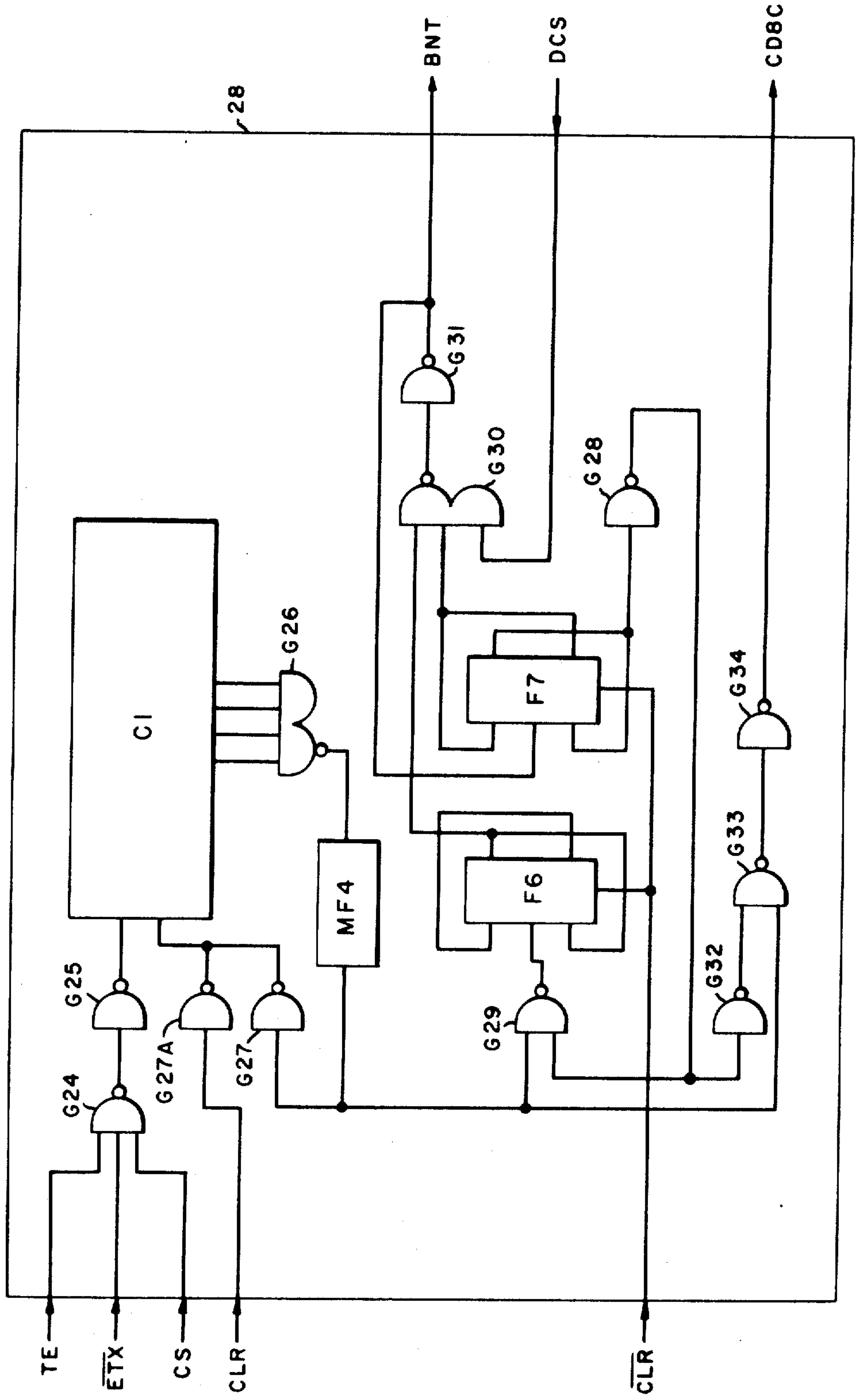

At the instant TE HI commences, BLK # (block number indication) enters SR1 and SR2. Since it is desired to retain block number indication for entry in the last column of the card to be punched, the circuit means of FIG. 6 is effective to provide an output signal, BNT, to designate (when HI) a suitable time for transfer of block number indication from the data register to storage. The circuit means of FIG. 6 also functions such that vertical parity indication is suppressed during the time period in which block number message portion is resident in SR1 and SR2 and such that the block number message portion is not identified as a characterindicating word. For these latter purposes, the FIG. 6 circuit means provides an output signal, CD8C, to indicate (when HI) the residence exclusively of each character-indicating word in the data register. As discussed below, this signal is employed in vertical parity detection, and hence vertical parity detection for block number indication is inhibited. In generating these output signals, the means of FIG. 6 is responsive to input signals TE, $\overline{ETX}$ (not end of transmission when HI), CS, CLR, $\overline{CLR}$ and DCS.

G24 provides a LO input to G25 on each CS HI during TE HI and $\overline{ETX}$ HI. G25 steps counter C1 by one count on each G24 LO. G26 receives binary outputs from C1, which are all HI exclusively on the occurrence of an eight-count in C1, whereupon G26 provides a LO input to MF4. MF4 then provides a HI input to G27 and the LO output from G27 resets C1 to ZERO. The operation of this portion of the FIG. 6 circuitry is repetitive until $\overline{ETX}$ LO at which time G24 is disabled. At the start of TE HI, F6 and F7 are both LO, having been so reset by the prior $\overline{CLR}$ LO. C1 is reset to ZERO count by G27A on the prior CLR HI. With F7 LO the F7 input to G28 is LO and G28 provides a HI input to G29. On the occurrence of the initial MF4 HI, a LO is provided by G29 to F6, setting F6 HI. The upper two inputs to G30 are then HI and, on the next DCS HI, the input to G31 is LO and G31 provides a BNT HI. Following this DCS HI, G31 goes LO thereby setting F7 HI, disabling G30 and insuring that no further BNT HI occurs during C1 counting. At the same time F7 provides a HI input to G28 which in turn applies a LO TO G29, disabling G29.

By this circuitry of FIG. 6, a single BNT HI is provided at a predetermined time, namely, eight counts after the start of TE HI, at which time block number indication is resident in SR1.

With G28 LO, G32 provides a HI to G33. On the occurrence of the next succeeding MF4 HI, and for each MF4 HI thereafter, G33 applies a LO to G34 and G34 provides a CD8C HI. In this manner, the circuit means of FIG. 6 provides a signal for use in examining vertical parity exclusively at periods of time in which successive character-indicating words are resident in SR1. Such signal, CD8C HI, is not provided during the period of residence of block number indication in SR1 thereby fulfilling the above-discussed objective of inhibiting vertical parity generation for block number indication.

GOOD CHARACTER DETECTOR

Figure 7:
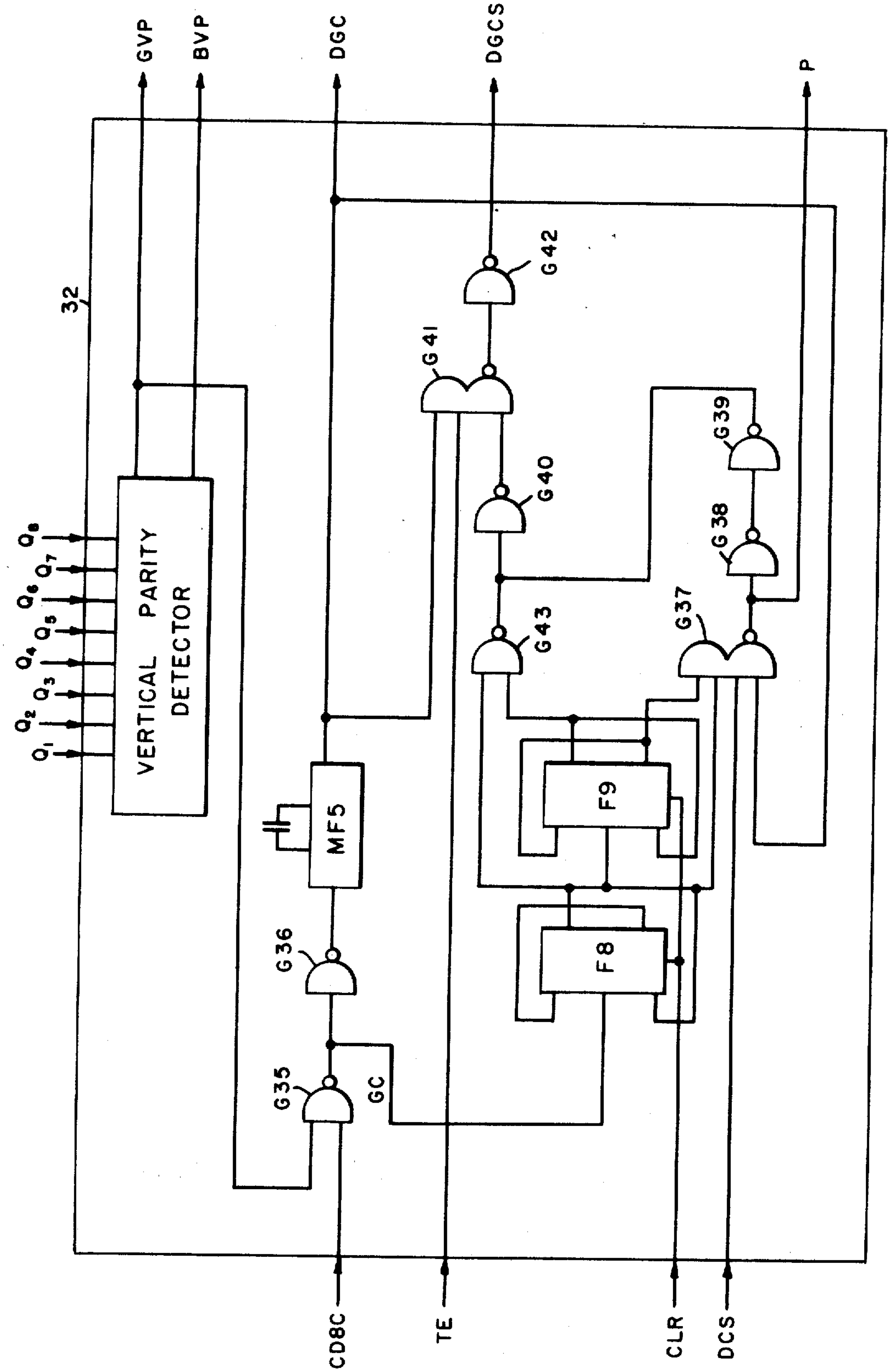

The circuit means of FIG. 7 is adapted to provide output signals, GVP (good vertical parity) and BVP (bad vertical parity), continuously indicative of the vertical parity $Q_1$–$Q_8$, and further output signals, DGC (good character in data register — delayed) and DGCS (good character strobe — delayed), selectively indicative of the vertical parity of $Q_1$–$Q_8$ when each character-indicating word is resident in SR1. These output signals are generated in response to input signals comprising $Q_1$–$Q_8$, TE CD8C, CLR and DCS.

The GVP and BVP signals are provided by exclusive-OR comparison of output signals $Q_1$–$Q_8$ of SR1 in a vertical parity detector. As will be evident, the vertical parity detector generates its output signals continuously, irrespective of the non-registry of character-indicating words in SR1, and means are accordingly required for selectively examining the detector output signals at times when each such word is in SR1. For this purpose, the CD8C signal, indicative of the residence of each character-indicating word in SR1, is applied to G35 together with the GVP signal and G35 provides a GC LO (good character) exclusively where good parity exists at the completion of insertion in SR1 of each successive eight-bit word defining a character. G36 provides a HI output in response to each such condition and, upon completion of its preset delay, MF5 provides a DGC HI, indicating that a good character is then resident in SR1.

In the disclosed embodiment of the data register (FIG. 4) 16-bit, or two-word, storage is provided by SR1 and SR3, taken together. Parallel readout from the data register may thus be accomplished on a two-word at a time basis by the provision of a readout control signal, DGCS, occurring at half the frequency of DGC. The manner of generation of DGCS is as follows.

The initial GC LO sets F8 HI shortly before the first DGC HI occurs since the MF5 output is delayed with respect to GC LO. G37 thus receives a HI from F8 and a HI from F9 and provides a LO output on the occurrence of DCS HI during the first DGC HI. A P LO output signal is thereby provided, the purpose of which is discussed in detail below in connection with interface readout. With G37 LO, G38 provides a HI to G39 and this gate provides a LO to G40. All inputs to G41 then being HI, G41 applies a LO to G42 and G42 yields a first DGCS HI.

The second GC LO resets F8 LO and F9 is set HI by F8. G37 is thereby disabled and will remain so until the states of F8 and F9 are again respectively, as above, HI, LO. G43 is also disabled, the F8 input thereto being LO. The second GC LO is thus ineffective to generate a DGCS HI.

The third GC LO sets F8 HI. With both F8 and F9 HI, G43 applies a LO to G40 and all inputs to G41 are HI. G41 applies a LO to G42 and G42 yields a second DGCS HI.

The fourth GC LO resets F8 LO and F8 resets F9 LO. Both G37 and G43 are disabled by F8 LO and the fourth GC LO is thus ineffective to generate a DGCS HI. On the fifth GC LO, the events above-discussed in connection with the first GC LO recur.

It will thus be seen that the circuit means of FIG. 7 provides one P LO and two DGCS HI for each four CD8C HI signals. In effect, a DGCS HI occurs once for every two character-indicating words in the data register and a P LO occurs once on the entry of every four character-indicating words in the data register.

LONGITUDINAL PARITY CHECKING SUBSYSTEM

This subsystem includes a longitudinal parity time controller (FIG. 8) and a longitudinal parity generator (FIG. 9) adapted to provide a determination of correct or incorrect longitudinal parity of preselected portions of the message. The structure and operation of the time controller will be discussed initially.

Figure 8:
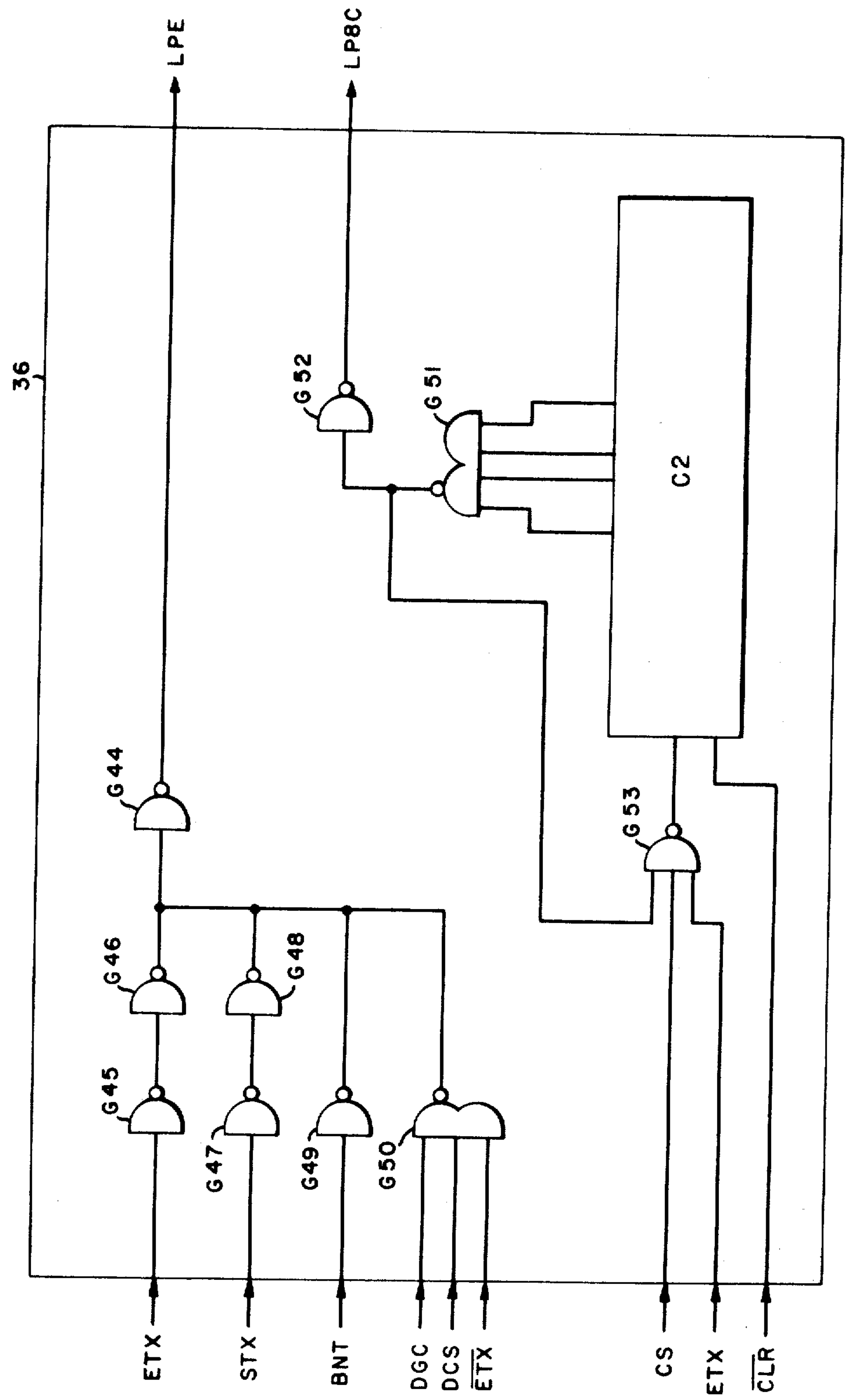

The circuit means of FIG. 8 is operatively responsive to input signals comprising ETX, STX, BNT, DGC, $\overline{ETX}$, $\overline{CLR}$, CS and DCS to provide a first output signal LPE (longitudinal parity enable when HI) and a second output signal LP8C (longitudinal parity eight-count when HI). LPE HI is provided on the occurrence of each DCS HI during good character detection (DGC HI), i.e., during the character message portion and also on the occurrence of BNT HI. In generating LPE, G44 receives inputs from four gates to which the aforementioned input signals are applied. ETX is applied to G45 and, during ETX HI, G46 receives a LO input from G45 and applies a HI to G44, thereby maintaining LPE LO during the ETX message portion. STX is applied to G47 and, during STX HI, G47 applies a LO input to G48. G48 in turn provides a HI input to G44 and G44 thus maintains LPE LO during the STX message portion. G49 is effective to invert BNT HI and apply a LO to G44 and G44 thereby provides an LPE HI coincidently with BNT HI. DGC, DCS and $\overline{ETX}$ are applied to G50 and G50 provides a LO to G44 where all inputs thereto are HI. Thus, on each coincidence of DCS HI and DGC HI during the character message portion, G44 provides an LPE HI.

In the generation of LP8C, counter C2 provides selective output signals to G51 such that G51 provides a LO output exclusively where C2 contains an eight-count. When this occurs, G52 provides an LP8C HI. C2 counts each LO provided by G53 and, since G53 is itself disabled where an eight-count occurs in C2, C2 is effective to perform its eight-count only once per message. This counting occurs only upon ETX HI and the eight CS HI signals occurring after ETX and prior to $\overline{CLR}$ LO are counted, namely, the CS HI signals occurring during entry of the LRCC message portion in SR1. LP8C HI persists until $\overline{CLR}$ LO occurs.

Figure 9:
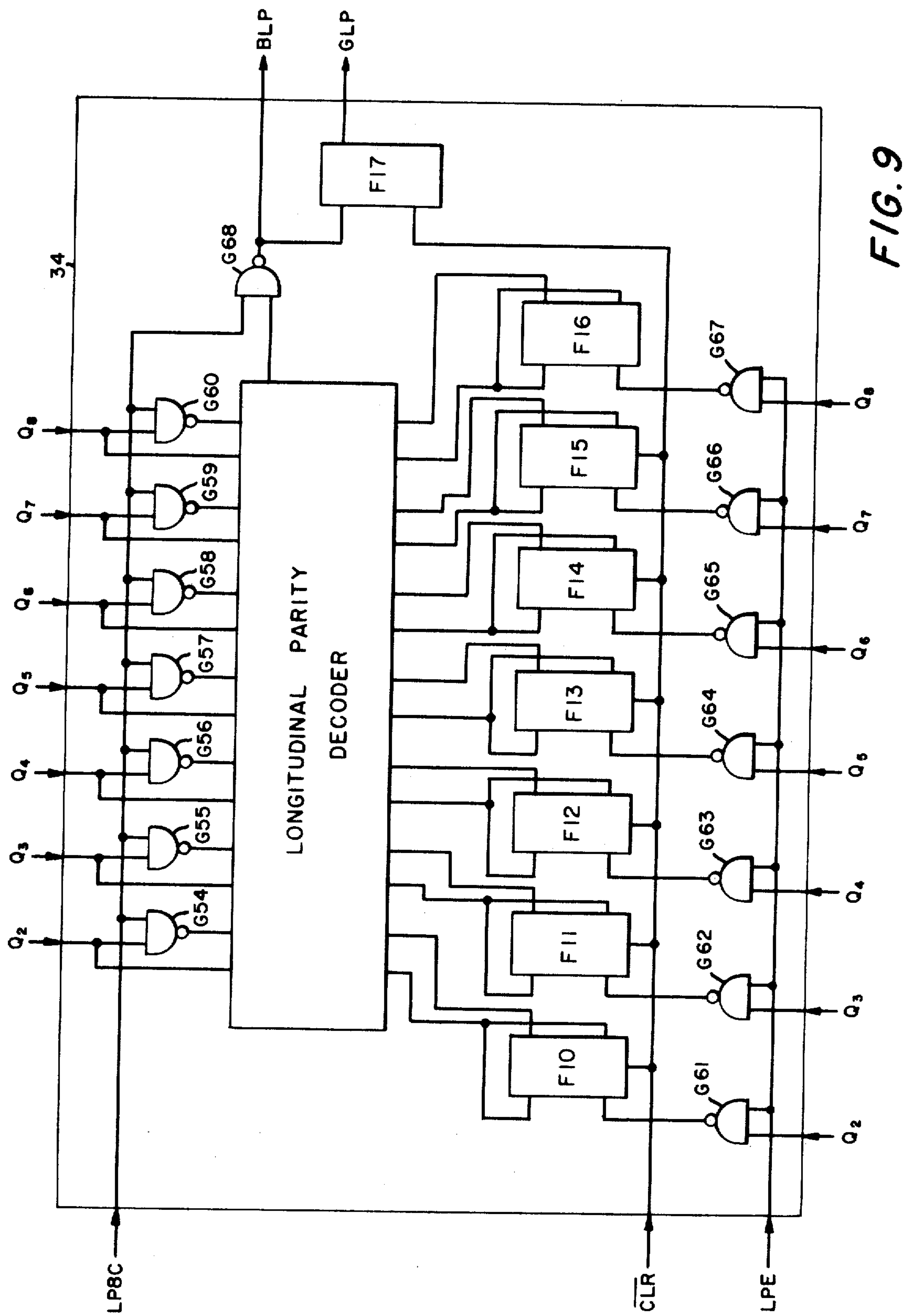

The longitudinal parity generator of FIG. 9 receives, as input signals, $Q_2$–$Q_8$ provided by SR1, the timing control signals LP8C and LPE discussed above and $\overline{CLR}$ and generates as output signals GLP (good longitudinal parity) and BLP (bad longitudinal parity). A longitudinal parity decoder performs an exclusive-or comparison of inputs received respectively from G54–G60 and F10–F16. G61–G67 provide inputs respectively to F10–F16 and G68 receives the result of the longitudinal parity decoder comparison and the LP8C signal and provides the BLP signal. F17 is responsive to G68 to provide the GLP signal.

As discussed above, LPE HI occurs coincidently with the DCS HI occurring on residence of block number indication and of each character-indicating word in SR1. The contents of SR1 indicated by $Q_2$–$Q_8$ are accordingly gated through G61–G67 to F10–F16 into the decoder for successive words to be involved in longitudinal parity examination. Considering F10, this unit will totalize the $Q_2$ signal at each LPE HI. F11–F16 will similarly totalize the $Q_3$–$Q_8$ signals present in SR1 at each LPE HI. At $\overline{ETX}$ LO, LPE HI is no longer provided and no further change occurs in F10–F16, which at that time are in states correlated with the discussed totalization of selected $Q_2$–$Q_8$ signals.

On the occurrence of LP8C at the end of LRCC, the LRCC message portion, then resident in SR1, is gated through G54–G60 into the decoder. The decoder provides its comparison results to G68 continuously throughout its operation and, upon occurrence of LP8C HI, the result then reached, i.e., on comparing the LRCC message portion with the contents of F10–F16, is gated through G68 If both inputs to G68 are HI, G68 provides a BLP LO and sets F17 HI to provide a GLP HI, indicative of good longitudinal parity.

ETX DETECTOR

Figure 10:
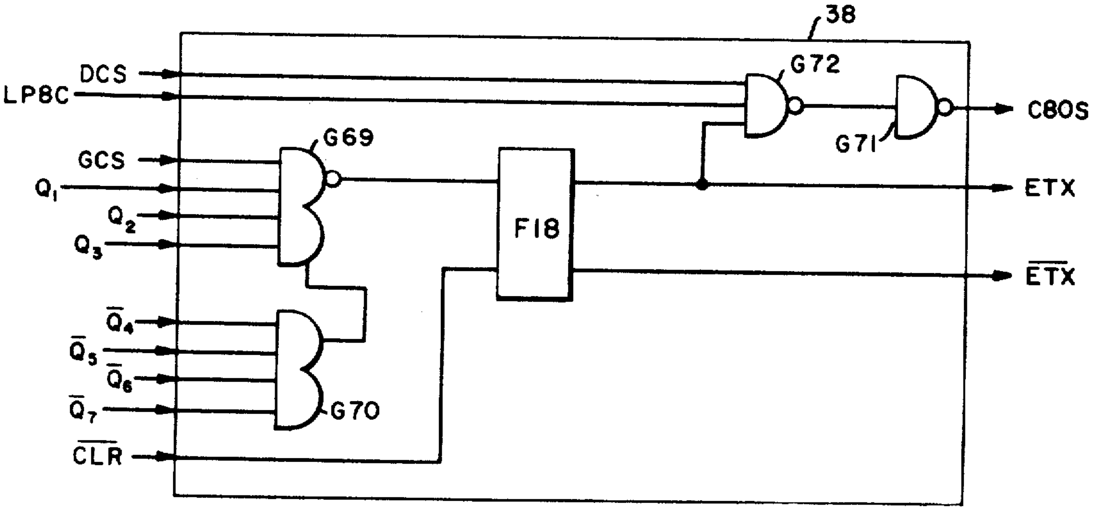

The circuit means of FIG. 10 is operatively responsive to GCS, $\overline{CLR}$ and selected Q and $\overline{Q}$ outputs of SR1 to provide output signals ETX and $\overline{ETX}$. A composite gate comprised of G69 and G70 receives $Q_1$–$Q_3$ and $\overline{Q_4}$–$\overline{Q_7}$. These signals comprise the SR1 outputs which are selectively HI during residence of the ETX message portion in SR1. The composite gate sets F18 HI on this occurrence and F18 generates ETX HI. $\overline{CLR}$ HI will reset F18 LO, and F18 will then provide an $\overline{ETX}$ HI.

Additional circuitry is included in FIG. 10 for generating the C80S (column 80 strobe) signal. This signal is required in order to provide information to the card punch machine respecting block number and card quality (good or bad card) at a time such that the same may be entered in the eightieth column of the card. In the generation of C80S HI, G71 receives a LO from G72. G72 provides such LO output exclusively where its inputs are ETX HI, LP8C HI and DCS HI, namely, at the conclusion of the checking of longitudinal parity.

CHARACTER ASSEMBLER

Figure 11:
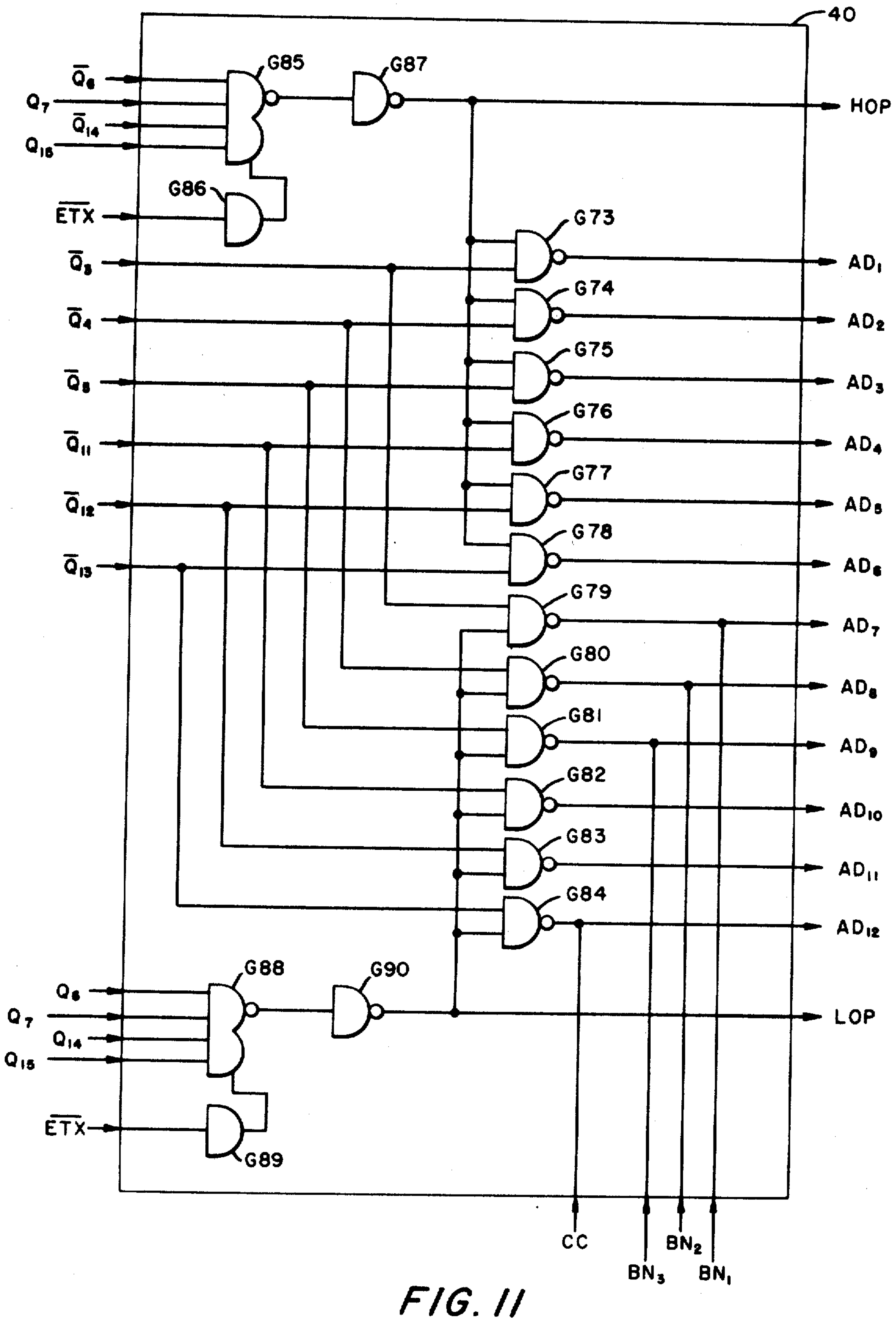

The circuit means of FIG. 11 receives selective Q and $\overline{Q}$ outputs of SR1–SR4 and $\overline{ETX}$ and operates, when $\overline{ETX}$ is HI, to detect field designations for properly assembling character information and to then assemble character information for delivery to interface output buffers.

During $\overline{ETX}$ HI, the message is continually conducted through SR1–SR4. At various times during $\overline{ETX}$ HI, a pair of character-indicating words will be resident in the data register. On these occurrences, the $\overline{Q_3}$, $\overline{Q_4}$ and $\overline{Q_5}$ outputs of SR2 define the three-bit character of the second word of the word pair, such character having two-bit field designation indicated either by $\overline{Q_6}$ HI, $Q_7$ HI (high order) or $Q_6$ HI, $Q_7$ HI (low order). Likewise, the $\overline{Q_{11}}$, $\overline{Q_{12}}$ and $\overline{Q_{13}}$ outputs of SR4 will define the three-bit character in the first word of the word pair, having two-bit field designation indicated either by $\overline{Q_{14}}$ HI, $Q_{15}$ HI (high order) or $Q_{14}$ HI, $Q_{15}$ HI (low order). Message-forming constraints are imposed such that high order and low order word pairs are formed successively, i.e., the first and second character-indicating words in the message are both high order words and the third and fourth message words are both low order words, etc. High order words are definitive of characters to be punched in the upper half of the card and low order words are definitive of characters to be punched in the lower half of the card.

By way of example, assume that the first two words in the message following the block number portion are definitive respectively of a first high order three-bit character $D_4$–$D_6$, intended for entry in the second uppermost character part of the card column to be punched, and a second high order three-bit character $D_1$–$D_3$, intended for entry in the uppermost character part of the card column. Since these characters are both intended for entry in the upper half of the card, HOP field designations are provided for each. When these words are resident in the data register, $\overline{Q_{11}}$, $\overline{Q_{12}}$ and $\overline{Q_{13}}$ (first character) will be applied to G76, G77 and G78 and $\overline{Q_3}$, $\overline{Q_4}$ and $\overline{Q_5}$ (second character) will be applied to G73, G74 and G75. At this time, all of the $\overline{Q_6}$, $Q_7$, $\overline{Q_{14}}$ and $Q_{15}$ inputs to G85 are HI, as is the input thereto from G86. G87 then receives a LO from G85 and provides a HOP HI output signal and enables G73–G78. The first and second characters are accordingly assembled respectively as $AD_4$–$AD_6$ and $AD_1$–$AD_3$. As discussed below, these AD lines are associated with interface buffer circuitry ultimately controlling card punch machine buffers providing information to the card upper half.

The remaining circuitry in FIG. 11 functions in like manner for assembly of lower order characters. The $Q_6$, $Q_7$, $Q_{14}$ and $Q_{15}$ inputs to G88 are HI, as is the input thereto from G89, when two words containing lower order characters are resident in the data register and G90 thereupon provides an LOP HI.

The assembly provides outputs $AD_{10}$–$AD_{12}$, definitive of the three-bit character intended for entry in the third uppermost character part of the card column to be punched and $AD_7$–$AD_9$, definitive of the three-bit character intended for entry in the lowermost character part of the card column.

The CC and $BN_1$–$BN_3$ inputs to the character assembler are discussed in detail in connection with FIG. 14. These inputs control assembly of $AD_{12}$ and $AD_7$–$AD_9$ for entry of card quality and block number information.

INTERFACE READOUT

Figure 12:
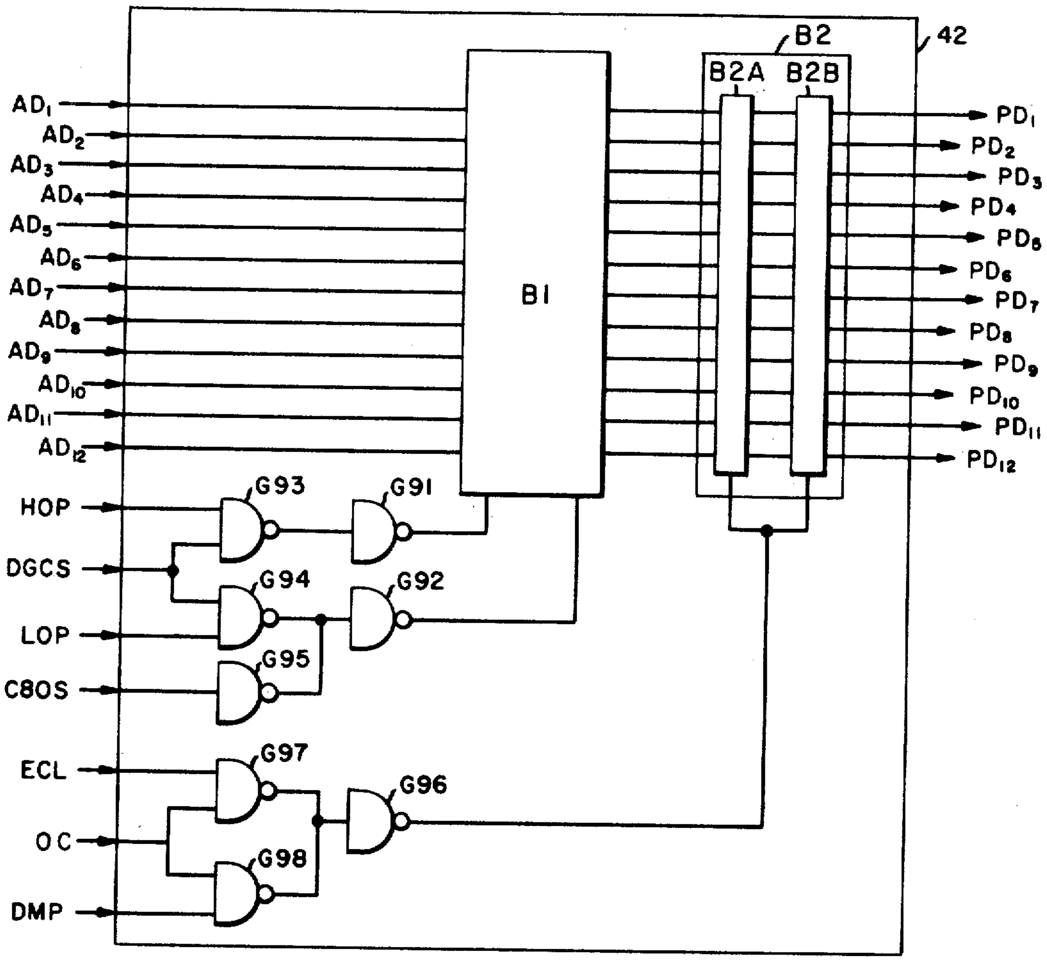

Referring to the interface readout of FIG. 12, the $AD_1$–$AD_{12}$ signals generated by the character assembler are applied to buffer B1 comprised of a series of twelve gated F stages, six of which are gated by G91 and the remainder by G92. G91 provides a HI gating signal on each LO output of G93, i.e., on each DGCS HI during HOP HI. By this gating, the two characters then assembled as $AD_1$–$AD_6$ are gated into six stages of B1. G92 provides a HI gating signal on each LO output of G94, i.e., on each DGCS HI during LOP HI. By this gating, the two characters then assembled as $AD_7$–$AD_{12}$ are gated into the other stages of B1. A further G92 gating signal is provided when C80S is HI whereupon the G95 output is LO.

The outputs of the stages of B1 are applied to buffer B2 and the B2 outputs $PD_1$–$PD_{12}$ (punch data) are conducted directly to input buffers of the card punch machine. B2 comprises a first set B2A of 12 gated F stages each receiving one of the B1 outputs and a second set B2B of twelve gated F stages each receiving an output of B2A.

Entry of the contents of B1 into B2A is controlled by G96, as is the entry of the contents of B2A into B2B. This gate provides a HI output for such control when either of G97 or G98 provide LO outputs. The G97 output is LO when ECL (even column load) and OC (odd column) are HI. The G98 output is LO when OC and DMP (data marker preset) are HI. These control signals are generated as discussed immediately below.

INTERFACE READOUT CONTROLLER

Figure 13:
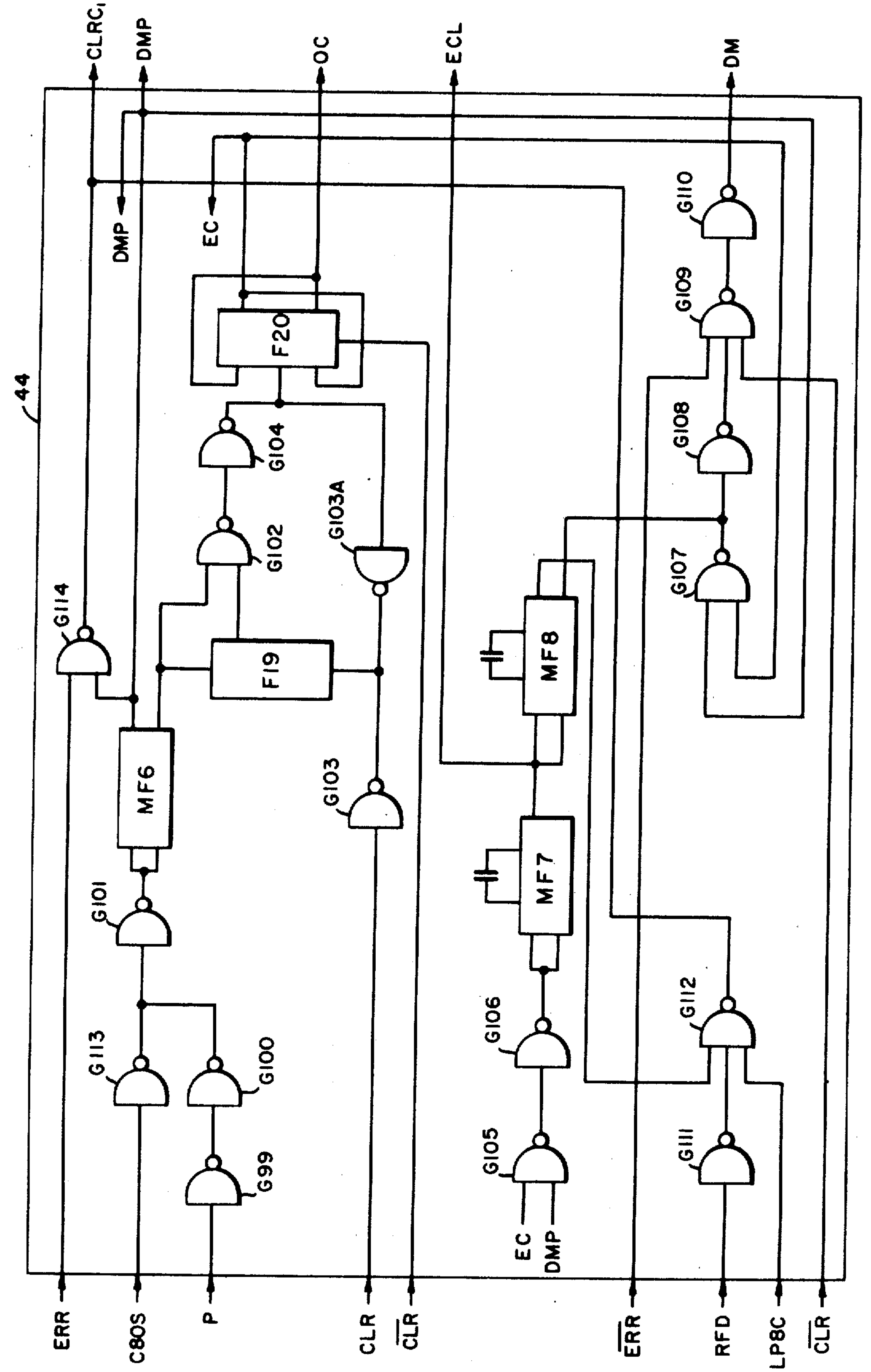

The circuit means of FIG. 13 generates the control signals OC, ECL and DM, required in the interface readout of FIG. 12 primarily in response to the input signals P and C80S, and controller-generated signals EC (even column) and DMP (data marker preset). The remaining input signals, ERR $\overline{ERR}$, CLR, $\overline{CLR}$, RFD (punch ready for data) and LP8C are involved in part secondarily in the generation of such control signals and in part in the generation of the $CLRC_1$ output signal of the controller.

When the first P LO occurs, G99 applies a HI to G100. At this time the first four message characters are assembled as $AD_1$–$AD_{12}$. G100 in turn applies a LO to G101 and this gate applies a HI to MF6 whereupon MF6 generates a DMP HI. This operation is recurrent for each P LO and for C80S HI.

Prior to the first P LO, the MF6 input to G102 is HI and the F19 input to G102 is LO, F19 having been so reset by the prior CLR HI through G103. Thus, G102 applies a HI to G104 F20 to P LO, and the G104 input to F20 is LO. F20 thus remains LO, having been so reset by the prior $\overline{CLR}$ LO. As the first P LO occurs and MF6 is triggered, the G102 output remains LO until after F19 is set HI by MF6 LO. During this momentary interval DMP is HI and, since F20 is LO, OC is HI. Referring to FIG. 12, this condition provides a G96 and odd column information is gated from B1 into the B2A. This operation is recurrent for each P LO and for C80S HI.

Upon completion of such momentary interval, F19 is set HI by MF6 LO and the G102 output goes LO. The G104 output goes HI and sets F20 whereupon F20 provides EC HI. F19 is reset LO by the LO output of G103A. Since the EC and DMP inputs to G105, which initiates generation of DM HI (data marker to punch), are not coincidently HI during the foregoing operations, DM HI is not yet generated.

After the above-mentioned G96 HI, the character assembler operates to assemble the second four message characters as $AD_1$–$AD_{12}$ and the second P LO, indicative of such character assembly, generates a second DMP HI. With EC then HI, G105 applies a LO to G106. G106 applies a HI to MF7 and, after preset delay, MF7 generates an ECL HI.

The above-discussed ECL HI occurs during such OC HI and the output of G96 of FIG. 12 goes HI for a second time. The even column information then in B1 is transferred to B2A and the odd column information is coincidently transferred from B2A to B2B.

Coincidently with the second P LO, both inputs to G107 are HI. The G108 output is thus HI and, with $\overline{ERR}$ HI and $\overline{CLR}$ HI (no error or clear), G109 applies a LO to G110. G110 yields the first DM HI. On receipt of the first DM HI, which occurs after ECL HI, the card punch machine takes $PD_1$–$PD_{12}$ from B2, namely, the contents (odd column information) of B2B.

The recurrent operations of MF6 and F19–F20 attending the second P LO result in the generation of another G96 HI whereupon the even column information in B2A is transferred to B2B and new odd column information is gated from B1 into B2A.

Following a time interval after ECL HI, determined by the preset delay of MF8, MF8 applies a LO to G108 and this gate applies a HI to G109. If $\overline{ERR}$ HI and $\overline{CLR}$ HI are present, all inputs to G109 are again HI and this gate applies a LO to G110. Under these conditions G110 provides a second DM HI. On receipt of the second DM HI, the card punch machine again takes $PD_1$–$PD_{12}$ from B2, namely, the contents (even column information) of B2B.

In summary of the foregoing controller operations, first multiple characters are assembled, are transferred in unison to B2A and are further transferred from B2A into B2B prior to transfer of second multiple characters into B2A, such transfer into B2B being undertaken after removal of the first characters from B2B by the punch card machine. In addition, pairs of first and second multiple characters are made successively available to the card punch machine with minimum delay therebetween in anticipation of the input data demands of such machine, i.e., data sufficient for the punching of two columns at one time. Synchronism in the system, as evidenced in a constant data transmission rate and continuous card punch machine operation, is thereby effected. Typically, card punch machines derive information from input apparatus for single column punching on card punch machine demand, i.e., on generation by the card punch machine of an RFD HI (ready for data). While the system of the invention may operate in such manner, such operation is not requisite.

Thus, the system of the invention makes use of such RFD HI signal for purposes of clearing interface logic. RFD is an input to G111 in FIG. 13. Where RFD is HI, G111 applies a LO to G112. G112 normally generates a HI output since the LP8C input thereto is LO Until and after message longitudinal parity determination is made. C80S HI occurs on the first DCS during LP8C HI, as above-discussed in connection with FIG. 8 and is applied to G113, which alternatively triggers MF6. Accordingly, if RFD is HI during LP8C HI and during the MF8 HI generated in response to C80S HI, the G112 output goes LO and $CLRC_1$LO is generated. The $CLRC_1$ signal is OR-circuited in FIG. 3 with $CLRC_2$ to provide CLRC. CLRC LO pulls LO the normally HI input to G2 and the resulting G2 HI output triggers MF1 thereby providing CLR HI and $\overline{CLR}$ LO, signals which clear interface logic and discontinue RFT HI. $CLRC_1$ LO is generated alternatively by G114 where an error is detected at MF6 HI.

BLOCK NUMBER STORAGE AND READOUT

Figure 14:
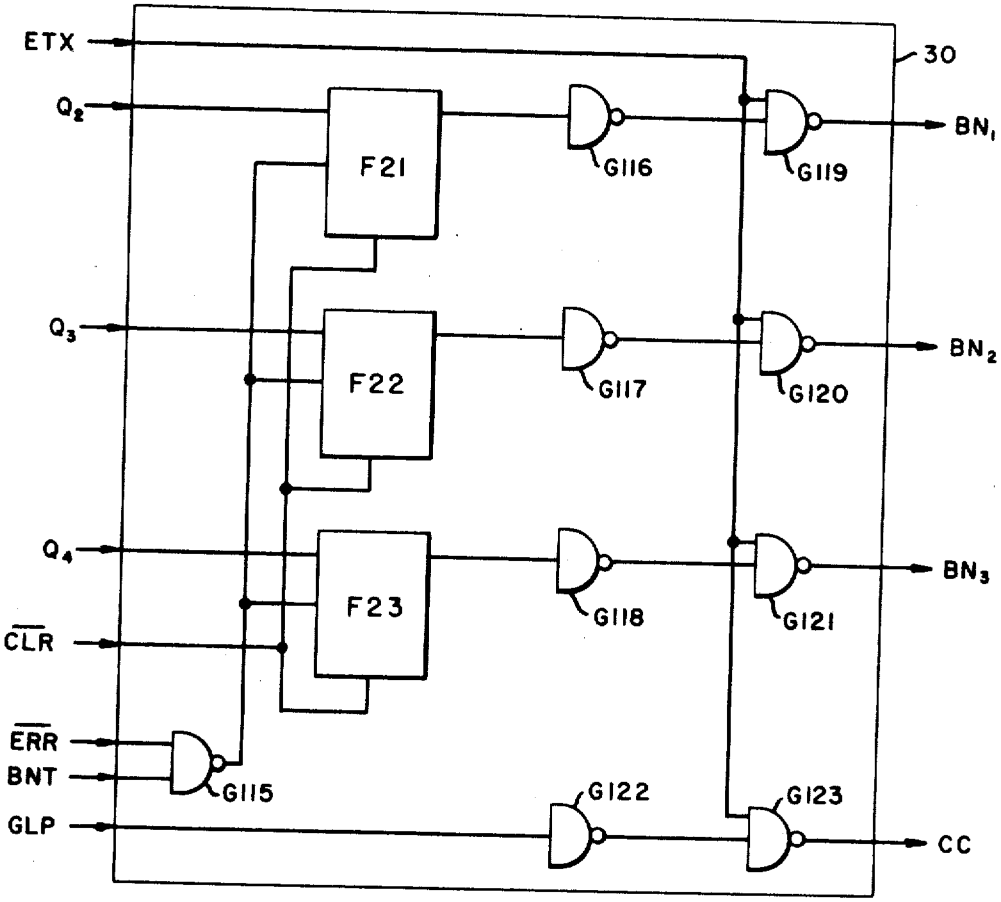

The circuit means of FIG. 14 is operatively responsive to selective Q outputs of SR1 and to $\overline{ERR}$ and BNT to store BN (block number) indication upon receipt thereof and to retain the same for subsequent transfer to the character assembler of FIG. 11. $\overline{CLR}$ HI resets F21–F23 LO. $Q_2$, $Q_3$ and $Q_4$ are applied respectively to F21, F22 and F23. At BNT HI $Q_2$, $Q_3$ and $Q_4$ contain the block number indication. On the coincidence of $\overline{ERR}$ HI and BNT HI, G115 sets F21–F23 in accordance with block number indication. On ETX HI the contents of F21–F23 are provided as $BN_1$, $BN_2$ and $BN_3$. In the generation of $BN_1$–$BN_3$, G116, G117 and G118 receive the outputs of F21–F23 and in turn apply their outputs to G119, G120 and G121. By way of example, assuming the $Q_2$ bit of block number indication is HI, F21 is set HI upon G115 HI and F21 applies a HI to G116. The G116 input to G119 is LO. On ETX HI the G119 output stays at its prior HI and $BN_1$ HI is provided. In the event that $Q_2$ provided a LO block number indication bit, G119 would, on ETX HI, provide a $BN_1$ LO.

Referring to FIG. 11, $BN_1$ is connected to the output of G79 and, in effect G119 (FIG. 14) and G79 comprise a composite OR gate. Accordingly, the constant $BN_1$ HI occurring throughout system operation, except where $Q_2$ is LO at ETX HI, does not prevent $AD_7$ from indicating character signals generated by G79. The same applies of course to G80, G81 and G84 of FIG. 11.

Coincidently with the change of $BN_1$–$BN_3$ to reflect block number indication, CC HI is provided where GLP is HI. By this arrangement, $AD_7$–$AD_9$ and $AD_{12}$ of FIG. 11 are assembled for transfer to the card punch machine respectively in accordance with block number indication and card quality. In generating CC HI, G122 provides a LO output where GLP is HI and G123 maintains CC HI. In the event that longitudinal parity is bad, GLP is LO and G122 applies a HI input to G123 whereupon CC LO is applied to $AD_{12}$.

END PUNCH AND ERROR GENERATOR

Figure 15:
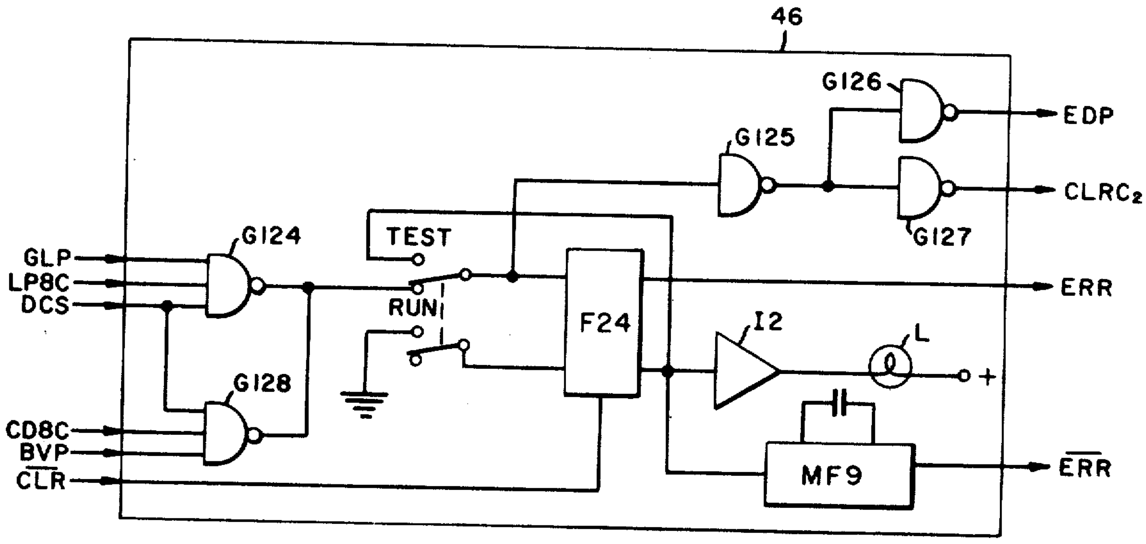

The circuit means of FIG. 15 provides output signals ERR and $\overline{ERR}$, indicative of error, and also yields signals indicative of the end of message processing or that message processing should not continue further, namely, $CLRC_1$ and EDP (end of data to punch when HI). Where bad vertical parity is present in respect of any character-indicating word in SR1, the BVP input to G124 is HI and, upon CD8C HI for such word and DCS HI, F24 is set HI if the TEST-RUN switch is in the RUN position. Where F24 is HI, ERR HI is generated and error lamp L is energized by 12. $\overline{ERR}$ is normally HI, and under this condition, is momentarily LO following the delay preset in MF9.

When G124 provides a HI output, G125 applies a LO to G126 and G127. G126 yields an EDP HI to inform the punch that no further data will follow. G127 yields a $CLRC_2$ HI which, as in the case of $CLRC_1$, generates CLR HI through the FIG. 3 circuit means. F24 is reset LO by $\overline{CLR}$ LO.

All inputs to G128 are HI where GLP, LP8C and DCS are all coincidently HI. This condition occurs exclusively where good longitudinal parity exists at the end of reception of LRCC, i.e., when a complete message has been successfully transmitted and received. When G128 provides a HI output, G124–G127 operate to generate EDP HI and $CLRC_2$ HI, as above discussed for G124.

Conclusion

Various modifications to the foregoing particularly described systems of the invention will be evident to those skilled in the art. For example, the 16-bit storage provided collectively by SR1 and SR2 may be expanded, e.g., to 32 bit storage, in which case the selection of the $m$ signal subgroups from each of the $n$ character-indicating words may be performed at one time for four ($q/m$) character indicating words. As a further example of such modification, the $r$ simultaneous card column punching facility of the card punch machine need not be restricted to the instance where $r$ is two. Thus, $r$ may comprise any number greater than unity, with buffer B2 containing $r$ sets of $q$ stages. Accordingly, the particularly described systems are intended in a descriptive and not in a limiting sense. The true spirit and scope of the invention will be evident from the following claims.

What is claimed is:

1. In a telephone line data transmission system comprising:
   a. a transmitting station including
      1. first means generating a succession of $n$ groups of digital data signals, each generated signal group identifying a one of $n$ subjects by the position thereof in said succession, each generated signal group including a subgroup of $m$ signals defining a one of $2^m$ characteristics of said subject; and
      2. second means conditioning said generated signal groups for transmission by said telephone line; and
   b. a receiving station including
      1. third means receiving said conditioned signal groups after telephone line transmission thereof and regenerating therefrom said $n$ groups of digital data signals in said succession; and
      2. fourth means producing a punched card of $p$ columns and $q$ rows containing indication of each of said subjects and its said defined characteristic, said fourth means being responsive to $r$ signal collections to simultaneously enter selective punches in $r$ of said $p$ columns, $r$ being a number greater than unity, the improvement, $p$ being a number less than $n$, $m$ being a number less than $q$, comprising:

3. fifth means in said receiving station receiving said regenerated signal groups and including first circuit means for selecting said *m* signal subgroup from each said regenerated signal group and collecting each successive $q/m$ selected signal subgroups, second circuit means having *r* serially-connected storage means each adapted to store $q/m$ signal subgroups and third circuit means conducting each signal collection of said first circuit means into the first of said *r* storage means, advancing stored signal collections into succeeding of said *r* storage means before each said conducting of a signal collection to effect the storing of r signal collections, and operable on storing *r* signal collections in said second circuit means to selectively conduct said *r* stored signal collections to said fourth means for said simultaneous *r* column punching thereby.

2. The system claimed in claim 1 wherein said first means generates in each signal group a parity indicating signal for said group and wherein said fifth means includes further circuit means receiving said parity indicating signal and detecting parity in each said regenerated signal group.

3. The system claimed in claim 1 wherein said first means generates a further digital signal group following said succession of *n* signal groups and indicative of parity in said succession, said fifth means including further circuit means receiving said signal group indicative of parity and detecting parity in said regenerated succession of *n* signal groups.

4. The system claimed in claim 1 wherein said first means generates further signals preceding said succession of *n* signal groups and indicative of block number indication for said succession, said fifth means including further circuit means receiving and storing said signals indicative of block number indication.

5. The system claimed in claim 4 wherein said fifth means includes additional circuit means conducting said stored signals indicative of block number to said fourth means subsequent to the conducting by said third circuit means of all said *r* signal collections to said fourth means for entering selective punches in said card indicative of block number indication.

6. The system claimed in claim 1 wherein said first means generates a further digital signal group preceding said succession of *n* signal groups and indicative of the commencement of said succession, said fifth means including further circuit means receiving said further signal group and responsive thereto initiate operation of said first circuit means.

7. The system claimed in claim 1 wherein said first means generates a further digital signal group following said succession of *n* signal groups and indicative of the conclusion of said succession, said fifth means including further circuit means receiving said further signal group and responsive thereto to discontinue operation of said first circuit means.

8. In a system for providing indication of *n* subjects and a one of $2^m$ characteristics of each subject on receipt of input signals including a succession of *n* groups of digital data signals, each signal group identifying a one of said *n* subjects by the position thereof in said succession, each signal group including a subgroup of *m* signals defining said subject characteristic, said system including a. first means producing a punched card of *p* columns and *q* rows providing said indication of *n* subjects and said one of $2^m$ characteristics for each subject, said first means adapted for simultaneously providing punches in *r* of said *p* columns, *r* being a number greater than unity, the improvement, *p* being a number less than *n*, *m* being a number less than *q*, comprising:

b. second means receiving said signal groups and including first circuit means for selecting said *m* signal subgroup from each said received signal group and collecting each successive $q/m$ selected signal subgroups, second circuit means having *r* serially-connected storage means each adapted to store $q/m$ signal subgroups and third circuit means conducting each signal collection of said first circuit means into the first of said *r* storage means, advancing stored signal collections into succeeding of said *r* storage means before each said conducting of a signal collection to effect the storing of *r* signal collections in said second circuit means, and operable on storing *r* signal collections in said second circuit means to selectively conduct said *r* signal collections to said fourth means for said simultaneous *r* column punching thereby.

9. The system claimed in claim 8 wherein each signal group includes a parity indicating signal for said group and wherein said second means includes further circuit means receiving said parity indicating signal and detecting parity in each said signal group.

10. The system claimed in claim 8 wherein said input signals include a further digital signal group following said succession of *n* signal groups and indicative of parity in said succession, said second means including further circuit means receiving said signal group indicative of parity and detecting parity in said succession of *n* signal groups.

11. The system claimed in claim wherein said input signals include further signals preceding said succession of *n* signal groups and indicative of block number indication for said succession, said second means including further circuit means receiving and storing said signals indicative of block number indication.

12. The system claimed in claim 11 wherein said second means includes additional circuit means conducting said stored signals indicative of block number to said first means subsequent to the conducting by said third circuit means of all said *r* signal collections to said first means for entering selective punches in said card indicative of block number indication.

13. The system claimed in claim 8 wherein said input signals include a further digital signal group preceding said succession of *n* signal groups and indicative of the commencement of said succession, said second means including further circuit means receiving said further signal group and responsive thereto to initiate operation of said first circuit means.

14. The system claimed in claim 8 wherein said output signals include a further digital signal group following said succession of *n* signal groups and indicative of the conclusion of said succession, said second means including further circuit means receiving said further signal group and responsive thereto to discontinue operation of said first circuit means.

15. A system for providing an interface between a digital signal source and a card punch machine, said source providing output signals including a succession of $n$ digital signal groups, each signal group identifying a one of $n$ subjects by the position thereof in said succession, each signal group including a subgroup of $m$ signals defining a one of $2^m$ characteristics of said subject identified thereby, said card punch machine adapted to simultaneously punch $r$ columns of a card having $p$ columns and $q$ rows, said card providing indication on repetitive punching thereof of each of said subjects and its said defined characteristic, $p$ being a number less than $n$, $m$ being a number less than $q$, $r$ being a number greater than unity, said system comprising:

a. first circuit means for selecting said $m$ signal subgroup from each said signal group and collecting each successive $q/m$ selected signal subgroups;
b. second circuit means having $r$ serially-connected storage means each adapted to store $q/m$ signal subgroups; and
c. third circuit means conducting each signal collection of said first circuit means into the first of said $r$ storage means, advancing stored signal collections into succeeding of said $r$ storage means before each said conducting of a signal collection to effect the storing of $r$ signal collections, and operable on storing $r$ signal collections in said second circuit means to selectively conduct said $r$ signal collections then stored in said second circuit means to said card punch machine for said simultaneous $r$ column punching thereby.

16. The system claimed in claim 15 wherein said source output signals include in each signal group a parity indicating signal for said group and wherein said system includes further circuit means receiving said parity indicating signal and detecting parity in each said signal group.

17. The system claimed in claim 15 wherein said source output signals include a further digital signal group following said succession of $n$ signal groups and indicative of parity in said succession, said system including further circuit means receiving said signal group indicative of parity and detecting parity in said succession of $n$ signal groups.

18. The system claimed in claim 15 wherein said source output signals include further signals preceding said succession of $n$ signal groups and indicative of block number indication for said succession, said system including further circuit means receiving and storing said signals indicative of block number indication.

19. The system claimed in claim 18 wherein said system includes additional circuit means conducting said stored signals indicative of block number to said card punch machine subsequent to the conducting by said third circuit means of all said $r$ signal collections to said punch card machine for entering selective punches in said card indicative of block number indication.

20. The system claimed in claim 15 wherein said source output signals include a further digital signal group preceding said succession of $n$ signal groups and indicative of the commencement of said succession, said system including further circuit means receiving said further signal group and responsive thereto to initiate operation of said first circuit means.

21. The system claimed in claim 15 wherein said source output signals include a further digital signal group following said succession of $n$ signal groups and indicative of the conclusion of said succession, said system including further circuit means receiving said further signal group and responsive thereto to discontinue operation of said first circuit means.

* * * * *

UNITED STATES PATENT OFFICE
CERTIFICATE OF CORRECTION

Patent No. 3,739,346 Dated June 12, 1973

Inventor(s) John R. Copeland and James F. Reid

It is certified that error appears in the above-identified patent and that said Letters Patent are hereby corrected as shown below:

Title page, item [73], "The Great Atlantic & Pacific Tea Company" should read --The Great Atlantic & Pacific Tea Company, Inc.--.

Column 2, line 56, "21B" should read --201B--.

Column 3, line 24, "twocolumn" should read --two-column--.

Column 3, line 48, "$S_5$" should read --$X_5$--.

Column 4, line 42, "sore" should read --store--.

Column 6, line 23, after "as" insert --in--.

Column 8, lines 58-59, "characterindicating" should read --character-indicating--.

Column 9, line 22, "TO" should read --to--.

Column 12, line 10, "Q" should read --$\bar{Q}$--.

Column 13, line 61, "F20" should read --prior--.

Column 15, line 2, "Until" should read --until--.

Column 17, line 51, after "thereto" insert --to--.

Column 18, line 24, "fourth" should read --first--.

Column 18, line 38, after "claim" insert --8--.

Signed and sealed this 20th day of November 1973.

(SEAL)
Attest:

EDWARD M. FLETCHER, JR.
Attesting Officer

RENE D. TEGTMEYER
Acting Commissioner of Patents